US011276026B2

(12) United States Patent
Dubois et al.

(10) Patent No.: US 11,276,026 B2
(45) Date of Patent: Mar. 15, 2022

(54) METHODS AND APPARATUS FOR USING A MOVEABLE SORT WALL TO FACILITATE ASSEMBLY OF PRODUCT ORDERS

(71) Applicant: 6 RIVER SYSTEMS, LLC, Waltham, MA (US)

(72) Inventors: Jerome Dubois, Waltham, MA (US); Christopher Cacioppo, Somerville, MA (US); Tim Higgins, Somerville, MA (US); Tucker Kelman Moffat, Stoneham, MA (US); Paul Forster Lyon, Merrimac, MA (US); Alexander Thieme, Upton, MA (US); Ellen Gilfillan Hawkes, Weston, MA (US)

(73) Assignee: 6 River Systems, Inc., Waltham, MA (US)

( * ) Notice: Subject to any disclaimer, the term of this patent is extended or adjusted under 35 U.S.C. 154(b) by 429 days.

(21) Appl. No.: 16/373,581

(22) Filed: Apr. 2, 2019

(65) Prior Publication Data

US 2020/0265380 A1   Aug. 20, 2020

Related U.S. Application Data

(60) Provisional application No. 62/805,883, filed on Feb. 14, 2019.

(51) Int. Cl.
*G06F 7/00* (2006.01)
*G06Q 10/08* (2012.01)
(Continued)

(52) U.S. Cl.
CPC ....... *G06Q 10/0835* (2013.01); *B65G 1/1373* (2013.01); *G06Q 10/0838* (2013.01); *G06Q 10/0875* (2013.01); *G06Q 50/28* (2013.01)

(58) Field of Classification Search
USPC .................. 700/213–216, 223, 228
See application file for complete search history.

(56) References Cited

U.S. PATENT DOCUMENTS

| | | | |
|---|---|---|---|
| 7,246,706 B1 | 7/2007 | Shakes et al. | |
| 7,516,848 B1 * | 4/2009 | Shakes ...................... | B07C 5/38 |
| | | | 209/34 |

(Continued)

OTHER PUBLICATIONS

Notification of Transmittal of the International Search Report and the Written Opinion of the International Searching Authority along with International Search Report and Written Opinion of the International Searching Authority from PCT/US2020/30517 dated Jul. 14, 2020, pp. 1-15.

(Continued)

*Primary Examiner* — Yolanda R Cumbess
(74) *Attorney, Agent, or Firm* — Foley & Lardner LLP

(57) ABSTRACT

Methods and apparatus for efficiently fulfilling product orders corresponding to different customers are described. An order processing system receives product orders from customers and efficiently groups multiple orders into sets of orders. A set of orders is assigned to a mobile sort wall, and a group of robotic carts is assigned to be used to collect products. The products corresponding to a set of orders are picked from racks and collected in the robotic carts. The mobile sort wall includes a plurality of different placement locations, e.g. bins. Each placement location is associated with one of the customer orders in the set of customer orders assigned to the mobile sort wall. A sorting kiosk including a scanner identifies a collected product, identifies a placement location, and the product is placed on the mobile sort wall. A loaded mobile sort wall is moved to a packaging area.

20 Claims, 11 Drawing Sheets

(51) Int. Cl.
*B65G 1/137* (2006.01)
*G06Q 50/28* (2012.01)

(56) References Cited

U.S. PATENT DOCUMENTS

| | | | |
|---|---|---|---|
| 10,138,060 B1* | 11/2018 | Mantha | B25J 5/02 |
| 2006/0206235 A1* | 9/2006 | Shakes | B65G 1/1373 |
| | | | 700/216 |
| 2017/0158431 A1 | 6/2017 | Hamilton et al. | |
| 2017/0169672 A1* | 6/2017 | Farrow | G08B 5/36 |
| 2018/0127212 A1* | 5/2018 | Jarvis | G05D 1/0234 |
| 2018/0265297 A1* | 9/2018 | Nakano | B66F 9/06 |

OTHER PUBLICATIONS

International Preliminary Report on Patentability for PCT/US2020/017786 dated Aug. 26, 2021 (9 pages).
International Search Report and Written Opinion for PCT/US2020/017786 dated Apr. 3, 2020 (11 pages).

* cited by examiner

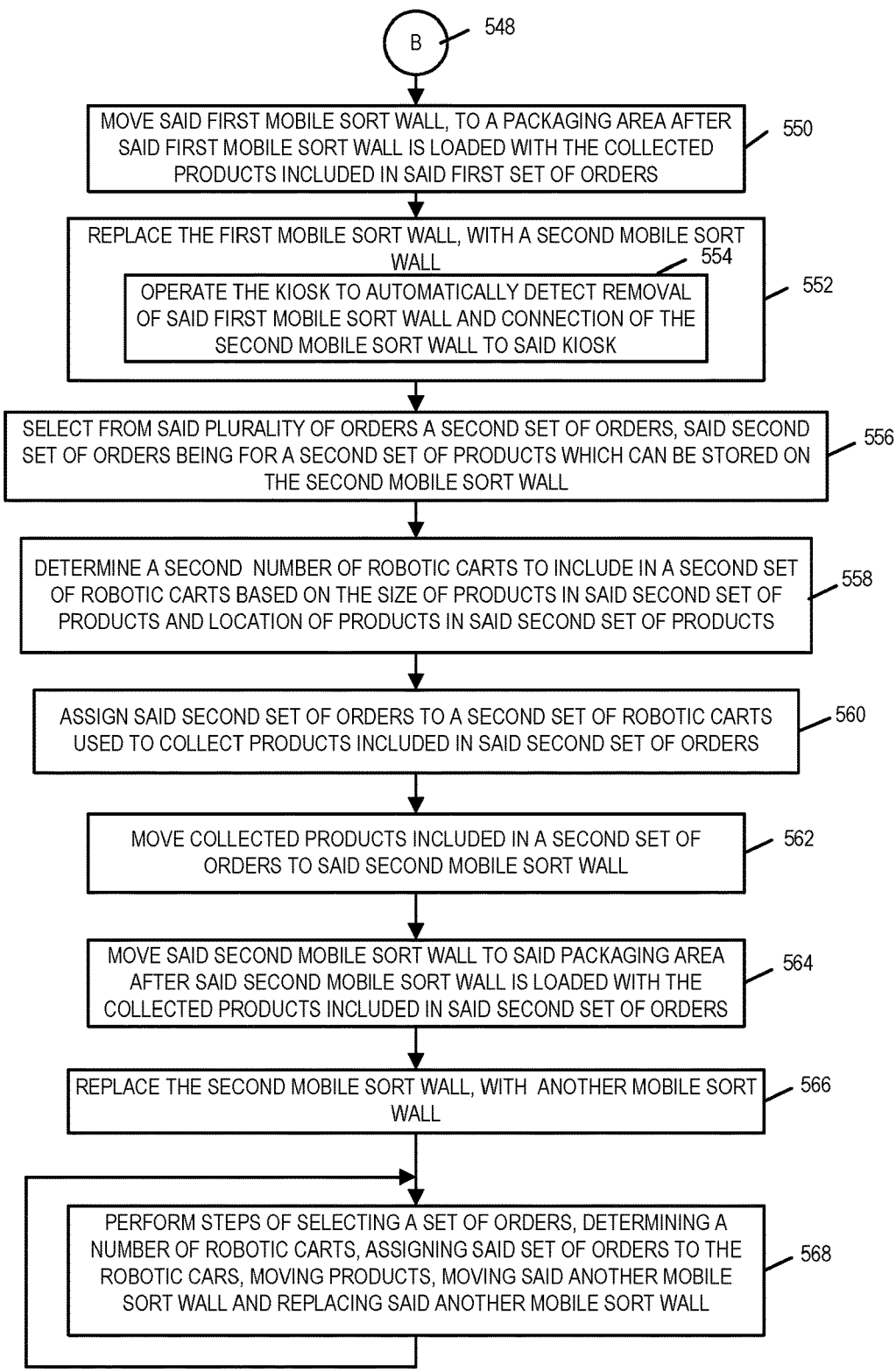

METHODS AND APPARATUS FOR USING A MOVEABLE SORT WALL TO FACILITATE ASSEMBLY OF PRODUCT ORDERS

RELATED APPLICATIONS

The present application claims the benefit of U.S. Provisional Application Ser. No. 62/805,883 filed Feb. 14, 2019 which is hereby expressly incorporated by reference in its entirety.

FIELD

The present application relates to order processing methods and apparatus, and more particularly, to methods and apparatus for facilitating assembly of product orders using a moveable sort wall.

BACKGROUND

Internet and mail orders have grown in popularity due to the convenience of being able to place an order and have it delivered to one's home or place of business. The need to be able to efficiently process an order including multiple items, collect the ordered items and arrange the ordered into a group, e.g., in one or more totes, for packaging is growing in importance.

One approach to processing an order is to have an individual collect the items for a single order from various locations in a warehouse and then provide the complete set of items corresponding to an order to a packaging department to be packaged for shipment. Such an approach avoids the mixing of items of different orders and avoids the need to sort the items after being picked from the shelves for placement with individual orders since the items of different orders are not intermingled after being picked from the warehouse shelves.

While a single pick approach to processing an order avoids the need to sort items for different orders after they are picked from the warehouse shelf such an approach may include a fair amount of walking for the person picking the order items. Time walking as opposed to picking items can be seen as leading to a decrease in efficiency.

An attempt to decrease the amount of time associated with moving from location to location with regard to picking items for an order involves a pick and then sort approach. In such an approach, sometimes referred to as a batch pick, a work will pick items from a warehouse shelf for multiple orders at the same time and then transport them together to a sorting area often implemented in the form a wall. A sort wall used to sort items collected for multiple orders normally includes one or more bins, e.g., totes, arranged together on shelves of the wall. Sets of bins for multiple different orders are normally arranged on the shelves and the items returned from a batch pick are sorted with the item for an order being placed in the bin or bins corresponding to a particular order. Such sort walls are normally secured in place with the space used for the bins of one order being reused on an ongoing basis as an order is completed. In such an approach a sort wall is used on a continuous basis with the bins of completed orders being removed or replaced with empty bins to be used for another order.

When batch picking is used with a sort wall efficiency a product is normally handled twice before being packaged, first when it is picked from a warehouse shelf and at least a second time when sorted at the sort wall and placed with a corresponding order. The inefficiency of double handling an item as part of satisfying an order is in many cases made up for by the efficiency gained from the warehouse worker being able to pick multiple items from the same shelf of the warehouse since in the case of a batch pick the worker is picking for multiple orders. Although there is some efficiency is getting orders from the same location, a major portion of the benefit of batch picking comes from not having to walk all over the warehouse to complete orders. For an extreme example, if I have a warehouse with 100 Aisles and 20 orders that all have things I need to get in aisle 1 and 100. The picker would either have to go walking back and forth across the huge warehouse, potentially up to 20 times or batch picking can be used in which case, one picker can get all the items in aisle 1, for example, and another picker can get all the items in aisle 100 and then the items collected by the different pickers can be sorted at a sort wall.

While the batch pick and sort wall approach to order fulfillment can lead to efficiencies, warehouse and wall space is often limited. Limited sorting wall space can result in delays due to incomplete orders occupying the limited wall space for extended periods of time and/or can result in confusion due to moving the location of bins for an order during the sorting process. In addition to the limited amount of available wall sorting space, the distance of the wall space for an order from sorting equipment can decrease the efficiency of the sort wall approach. As sort wall size is increased, the distance from bar code scanning or other sorting equipment used to match retrieved items to bins used for an order and the bins themselves increases on average. Using a large sort wall can thus requiring walking or other movement at the time of sorting which can decrease the efficiency gained by picking items for multiple orders from shelves at the same time.

In view of the above discussion it should be appreciated that it would be desirable if methods and/or apparatus could be developed which would allow for some or all of the efficiencies made possible through the use of batch picking and a sort wall without some of the disadvantages associated with existing sort wall approaches. In particular it would be desirable if the size of a sort wall could be kept small. While not necessary for all embodiments, it would also be desirable if the distance between sorting equipment and bin locations where products for orders could be placed could be keep relatively small while allowing the expensive sorting equipment to still be used with a large number of bins corresponding to different orders in a given amount of time allocated to order processing.

Given the above discussion it should be appreciated that there is a need for improved methods and apparatus for processing orders to group ordered items for packaging and shipping.

SUMMARY

Methods and apparatus of the present invention relate to collecting ordered items from locations in warehouse, e.g., from warehouse shelves, and then sorting the items based on the orders to which they correspond, e.g., with items corresponding to a particular order being placed in a bin or bins corresponding to the order. In the present application the term bin and tote are used interchangeably to refer to a container where items can be placed.

In accordance with some features of the invention orders are received, e.g., by an order processing system. The order processing system can be, and in some embodiments is, a cloud based computer system including a first interface for receiving orders, e.g., orders placed over the Internet. The order processing system further includes in some embodiments a memory and processor as well as a second interface which can be used for communicating order information to one or more computerized carts used to collect items corresponding to one or more orders and to a kiosk system used to facilitate sorting of collected items and placement of items corresponding to an order at designated bin locations on one or more sort walls.

In various embodiments orders are batched and grouped into sets of orders. The items for each set of orders are then assigned to one or more computerized pick carts. Thus for each set of orders, there is a corresponding assigned set of pick carts.

The computerized pick carts, in a set of pick carts corresponding to an order, are loaded with order information. Each communized pick cart in the set corresponding to an order guides a warehouse worker though the warehouse and provides guidance as to which items the worker associated with the pick cart is to collect. In accordance with one feature of the invention, the orders selected for a set are determined such that the full set of orders can be satisfied by using a single pick wall, e.g., mobile pick wall, to hold the completed orders corresponding to the set. In determining how many and/or which orders to include in a set the order processing system takes into consideration the size of the pick wall being used for the set of orders, e.g., the number of bins, size of the bins, and/or the weight which can be supported by the pick wall to be used for processing the set of order. With the knowledge of the pick wall capacity the number, size and weight of items in an order is taken into consideration when combining orders in a set to allow for the available wall space to be efficiently used and the full set of orders to be completed without have to shift or remove orders to make space for other orders in the set. This in at least some embodiments each set of orders can be satisfied using a single pick wall. In this way orders can be arranged into discrete sets where each set of orders can be completed using a single pick wall.

For purposes of understanding the invention a set of orders can be though of as a jigsaw puzzle with the items corresponding to orders in the set pieces in the puzzle that need to be arranged on shelves of the wall in a particular order to complete the set of orders. By treating each set of orders as a discrete unit that can fit on a single pick wall, the set of orders can be completed without having to move bins or totes of different orders just as a jigsaw puzzle can be completed by putting the pieces of the puzzle in the correct physical locations.

Once a set of orders corresponding to a sort wall have been completed and the wall loaded, in accordance with some embodiments the sort wall which is implemented is a moveable wall or wheeled rack, is moved to a packaging area to allow for the completed orders to be packaged. As one set of orders corresponding to a mobile sort wall is completed the sort wall is replaced with an empty sort wall corresponding to another set of orders.

By treating each sort wall as corresponding to a single complete set of orders, the need to shift or move bins, corresponding to an order, to make room for processing a new order is avoided. In addition if a single or few order items are missing, e.g., due to a pick error, they can be added after the wall is moved to the packing area or an intermediate area without tying up the space near the sorting equipment used to facilitate sorting of collected items.

Notably, in accordance with the invention, since the sort walls are moveable, sorting equipment can be placed at a location close to the sorting equipment and replaced as orders are completed. In this way, the distance between the sorting equipment and the sort wall bin locations where order items are to be placed can be keep relatively small as compared to systems with stationary walls where the bin locations are reused on an ongoing basis without a full set of orders being completed.

Notably, the sorting equipment often includes a scanner and computer, e.g. as part of a sorting kiosk. The computer of the kiosk receives order information and bin location information for different orders and matches the products delivered by the set of mobile computerized carts corresponding to an order to locations in the mobile sort wall assigned to handle a set of orders. The kiosk and associated sorting equipment can be costly as compared to the cost of wall bins and, in some embodiments, the kiosk and associated sorting equipment includes a pick arm and/or conveyer used to facilitate emptying of items from mobile carts and placement of the times in bins of the sort wall corresponding to individual orders. By using mobile sort walls, sorting equipment can be reused with multiple different sort walls allowing the costly sorting equipment to be used in an efficient manner as compared to systems where the sorting equipment is paired with a single fixed wall.

In some embodiments the sorting kiosk and mobile sort walls are mounted on wheels. The kiosk detects the presence of a sort wall in its vicinity either when a cable is connected between the kiosk and mobile sort wall or a wireless connection is established between a wireless interface of the kiosk and the wall. Based on order information and information of bin locations on the mobile sort wall connected to the kiosk the kiosk is able to determine the locations where items should be placed on the sort wall. As a picked item is scanned by the scanner on the kiosk as part of the item sorting process, the kiosk activates a light underneath, above, both, entirely around, and/or lighting up the interior of the bin on the sort wall corresponding to the order to which the scanned item corresponds. A worker or the pick arm then places the item in the indicated bin. The sort wall, in some embodiments, includes a light curtain or other sensor system for detecting placement of an item in a bin. As item placement is detected, the kiosk checks that the item was placed in the bin of the order to which the item corresponds. In some embodiments rather than use a detection system for detecting item placement the mobile sort wall includes a set of buttons under the bins and a user activates the button under a bin to signal placement of an item. Just as with the automatic sensing of item placement when placement of an item is manually signal the kiosk will perform a check to make sure the item was placed in the proper location.

In some embodiments sort walls can be configured to accept bins of different sizes and/or mobile sort walls with different bin configurations can be used. The bin sizes can be detected or manually indicated to the mobile sort wall and the lights/buttons at fixed locations under the bins will be controlled to match the bin configuration. For example when a single large bin is positioned over multiple lights, all the lights may be activated in unison or the center light activated to indicate an item should be placed in the bin. However when multiple small bins are inserted into the sort wall each bin may be directly over a single light and/or button associated with the bin above the light or button.

The order processing system takes into consideration configuration, e.g., size, number and location of bins of the available sort walls in determining how to combine orders into sets for picking and subsequent sorting.

As should be appreciated the time required to pick items corresponding to a set of orders to be loaded into a mobile sort wall can be considerably longer than the time required to sort the collected items and load them into a mobile sort wall.

In accordance with one feature of the invention the number of sets of mobile carts in use at a given time can be more than the number of sort walls coupled to the kiosk and available for loading. The system takes into consideration the amount of time to pick items for a set of orders and assigns multiple sets of pick carts to be in operation at a given time. Pick carts are organized in a staging area in some embodiments and moved to the sort wall area once the full set of pick carts corresponding to a sort wall have returned with the items to complete the corresponding mobile sort wall.

By treating mobile sort walls as corresponding to individual complete sets of orders, where the items of each set of orders can be picked using an assigned corresponding set of pick carts, sets of orders can be processed in a manner where the picking and sorting operations can be treated as discrete operations allowing for efficiencies to be achieved as compared to system where locations of a fixed sort wall are reused on an ongoing basis.

An exemplary method, in accordance with some embodiments, comprises: selecting from a plurality of orders a first set of orders, said first set of orders being for a first set of products which can be stored on a first sort wall; assigning said first set of orders to a first set of robotic carts used to collect products included in said first set of orders; and moving collected products included in said first set of orders to said first sort wall. An exemplary system, in accordance with some embodiments, comprises: a kiosk configured to control product sorting and placement of sets of products on mobile sort walls based on product to sort wall mapping information stored in said kiosk, said kiosk including: memory including product to sort wall mapping information; a scanner for scanning a product; a processor configured to control said kiosk to: detect connection of a first mobile sort wall; and control the first mobile sort wall to indicate a location where a first product is to be placed in a first mobile sort wall in response to the first product being scanned by said scanner.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are described in the detailed description which follows.

BRIEF DESCRIPTION OF THE FIGURES

FIG. 5C is a third part of a flowchart of an exemplary order processing method in accordance with an exemplary embodiment.

FIG. 5 comprises the combination of FIG. 5A, FIG. 5B and FIG. 5C.

DETAILED DESCRIPTION

Figure 1:
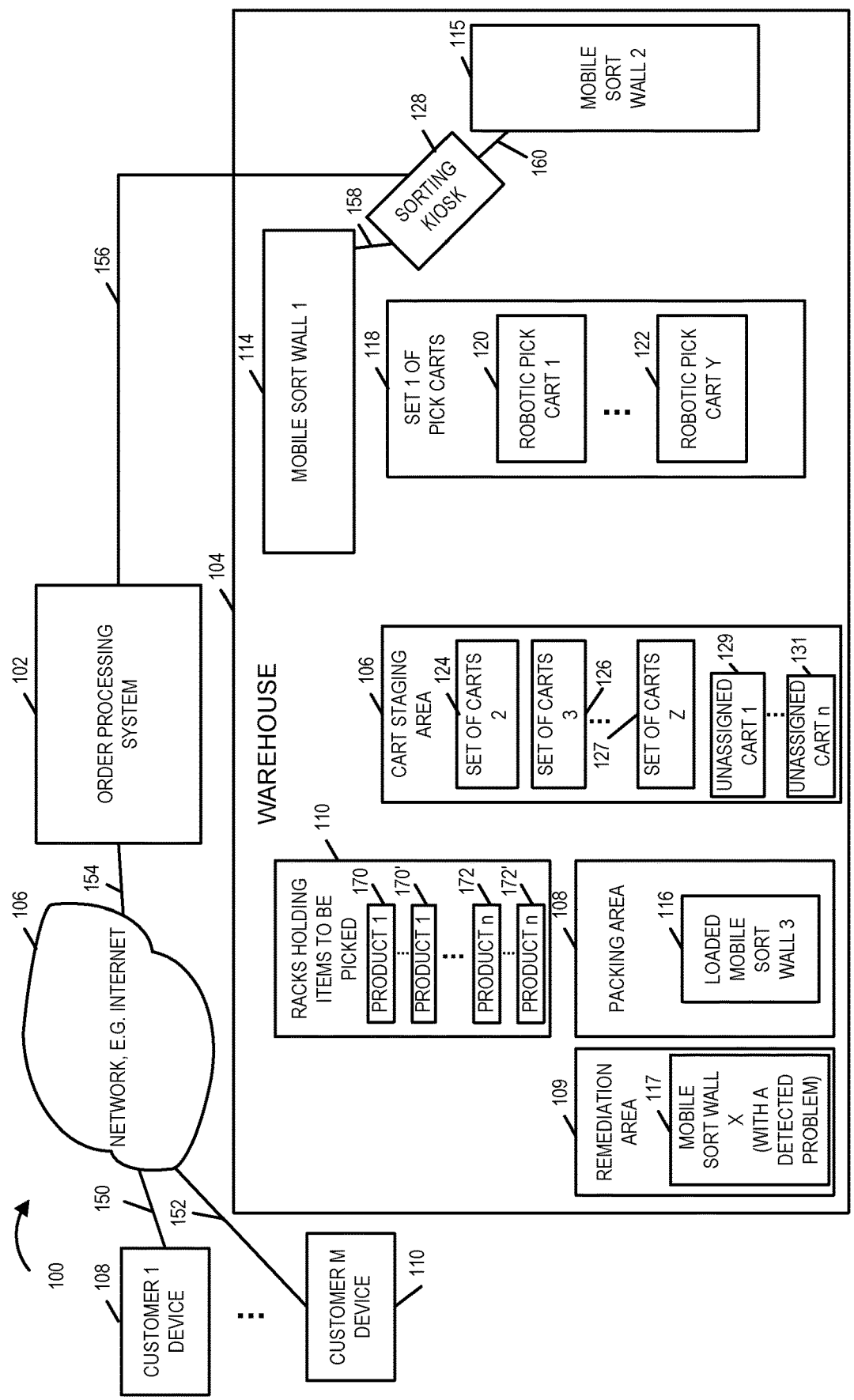
FIG. 1 illustrates an exemplary system in which the order processing methods and apparatus, including mobile sort walls, of the invention may be used.

Use of mobile sort walls in accordance with the invention ("Mobile Sort") enables warehouse operators to intelligently pick items corresponding to multiple orders and then sort transported in totes to discrete orders using a collaborative mobile robotic solution in combination with a mobile sorting wall system. The mobile sorting wall system uses moving sorting walls in combination with a sorting kiosk to facilitate efficient sorting of times to individual orders which can then be packaged and shipped.

Batching has long been used by each-picking operations to drive higher levels of productivity by consolidating and picking batches of items across discrete orders. The challenge has been managing the sortation of batches back to their discrete orders. Traditional automation (e.g. unit sorters) are expensive and complicated to run and manual sortation using put walls has been historically problematic, leading to a graveyard of unused automation in many of today's warehouses.

The present application describes a system of one or more smart kiosks, mobile sort walls, e.g., mobile put-to-light walls, and validation sensors/switches that work with an order processing system than can be implemented using cloud based software and mobile pick carts which in some, but not necessarily all embodiments, are robotic pick carts Workers, e.g., associates, are directed by the robotic pick carts in a computerized approach to having the pick carts guide workers to pick batches into totes, the robotic pick carts then autonomously shuttle the totes to take-off locations, e.g., sorting areas. In some embodiments the robotic pick carts are unloaded onto a mobile rack that is used to deliver the picked items to a sorting area where the sorting kiosk is located while in other embodiments the robotic pick carts corresponding to a set of orders are brought directly to the sorting kiosk or a staging area before being brought to the sorting kiosk. At the sorting kiosk an associate completes the sort of items into discrete bins, e.g., cubbies, directed by product images, lights and proximity sensors under the control of the kiosk which also performs validation of the sorting task based on sensor detection of item placement and/or workers pushing one or more buttons which control switches used to signal item placement in a bin.

Lightweight integration and a mobile design allows for a flexible and fast installation. The method and apparatus, from robotic pick carts to sort station, can be, and sometimes are, enhanced using machine learning and artificial intelligence to determine grouping of sets of orders and placement of orders on a sort wall.

In various embodiments the mobile sort system includes one, more or all of the following:

A seamless integration with cloud based software and a mobile robot/cart solution A mobile sortation solution where nothing is bolted to the floor Reduction in walk time to achieve the high order fulfillment rates The ability to merge items picked across different automation solutions or zones in a warehouse Intuitive interface using images, lights, and sensors that direct associates and validate tasks, accelerating training, improving rates and increasing accuracy With a simplified Warehouse Management System (WMS) integration, Mobile Sort manages the entire process from batching, picking to sorting In various embodiments mobile consolidation solution uses cloud software and mobile collaborative robots that works with any Warehouse Management System to enhance productivity and throughput for high volume, seasonal, high SKU count, direct-to-consumer warehouses. This new sortation solution can be and sometimes is powered by artificial intelligence that determines an efficient pick strategy (singles, batch and discrete orders) to increase throughput and in-aisle picking efficiency. "Mobile Sort" is a significant improvement over traditional put wall technologies that are expensive, require extensive WMS integration, are bolted to the ground and take months to deploy.

Direct-to-consumer and each-picking operations are under pressure to pick faster and scale for peak with fewer seasonal hires. The mobile sort wall system advances warehouse and order completion capabilities with a picking and sorting solution that is mobile and flexible, helping operators who are crunched for time, capital and resources balance performance and cycle times.

FIG. 1 illustrates an exemplary system 100 in which the order processing methods and apparatus, including mobile sort walls, of the invention may be used. Exemplary system 100 includes an order processing system 102, e.g., a order processing server, a sorting kiosk 128, a plurality of mobile sort walls including mobile sort wall 1 114, mobile sort wall 2 115, mobile sort wall 3 116 and mobile sort wall X 117, a plurality of robotic pick carts including robotic pick cart 1 120 and robotic pick cart Y 122, and racks holding items to be picked 110. Racks holding items to be picked include a plurality of products, e.g., multiple instances of each of the different products (product 1 170, . . . , product 1 170', . . . , product n 172, . . . , product n 172'). The plurality of mobile sort walls including mobile sort wall 1 114, mobile sort wall 2 115, mobile sort wall 3 116 and mobile sort wall X 117, the plurality of robotic pick carts including robotic pick cart 1 120 and robotic pick cart Y 122, and racks holding items, e.g., products, to be picked 110 are located within warehouse 104. Warehouse 104 includes a cart staging area 106, a packaging area 108 and a remediation area 109. Set 1 of mobile pick carts 118 includes a plurality mobile pick carts (robotic pick cart 1 124, . . . , robotic pick cart Y 122). Set 1 of pick carts 118 is located near the sorting kiosk 128 and near mobile sort wall 1 114.

Set 2 of robotic pick carts 124, set 3 of robotic pick carts 126 set Z 127 of robotic pick carts, each set including a plurality of robotic pick carts, are located within the cart staging area. Within cart staging area 106 there are also a plurality of mobile robotic carts which are currently unassigned to a set of robotic carts (unassigned mobile robotic pick cart 1 129, . . . unassigned mobile robotic pick cart n 131.)

In some embodiments, different sets of robotic carts, may, and sometimes do, include different numbers of robotic carts. For example, in one embodiment, set 118 includes more mobile robotic carts than set 2 124, and set 2 124 includes more mobile robotic carts than set 3 126. Mobile sort wall 3 116, is a mobile sort wall which has already been loaded at the sorting kiosk and is currently located in the packing area 108. Mobile sort wall X 117 is currently located within remediation area 109. The remediation area 109 is an area to which a mobile sort wall may be, and sometimes is, sent to correct problems.

Customer devices (customer 1 device 108, . . . , customer M device 110), which are, e.g., computers, smart cell phones, laptop PCs, etc. located at customer premises, used for placing product orders via the Internet. The customer devices (108, . . . , 110) are coupled to a network 106, e.g., the Internet, via communications links (150, . . . , 152), respectively. The network 106, e.g., the Internet, is coupled to order processing system 102 via communications link 154. The order processing system 102 is coupled to sorting kiosk 128 via communications link 156. As shown in FIG. 1, the sorting kiosk 128 is coupled to mobile sorting wall (mobile sorting wall 1 114, mobile sorting wall 2 115) via communications links (158, 160), respectively. At different times different one or more of the sorting walls (mobile sort wall 1 114, mobile sort wall 2 115, mobile sort wall 3 116, . . . , mobile sort wall X 117) may be coupled to the sorting kiosk 128.

In some embodiments, number of mobile sort walls in the system 100 exceeds the number of sort kiosks in the system 100 by at least a factor of 4 to one.

Figure 2:
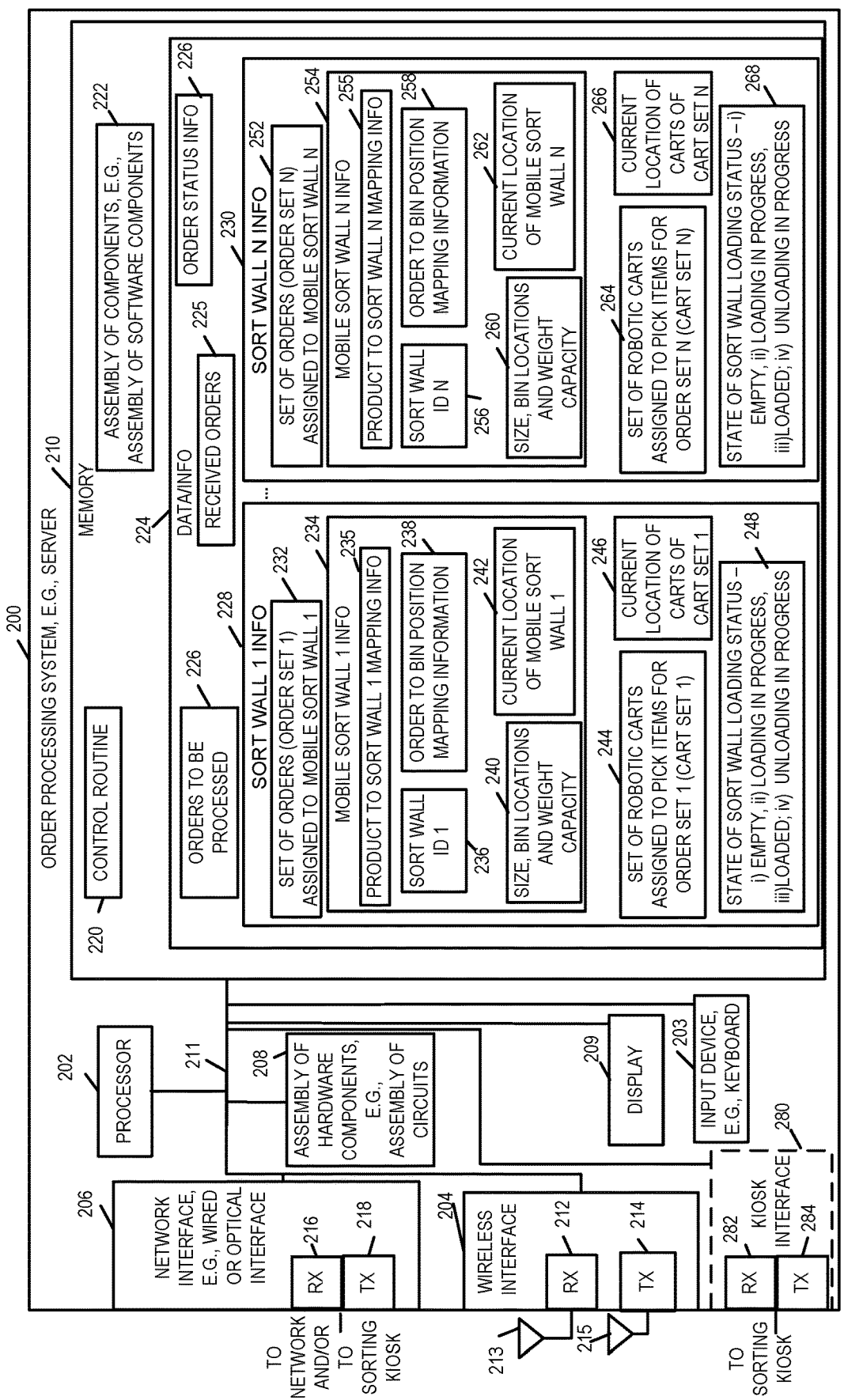
FIG. 2 illustrates an exemplary order processing system, e.g., a order processing server, that can be used in the system of FIG. 1.

FIG. 2 illustrates an exemplary order processing system 200, e.g., an order processing server 200 in accordance with an exemplary embodiment. Order processing system 200 can be, and sometimes is, used in the system 100 of FIG. 1. Order processing system 200 of FIG. 2 is, e.g. order processing system 102 of FIG. 1. Order processing system 200 implements steps of a method, e.g., steps of the method of flowchart 500 of FIG. 5.

Order processing system 200, e.g., an order processing server, includes a processor 202, e.g., a CPU, an input device 203, e.g., a keyboard, a wireless interface 204, a network interface 206, an assembly of hardware components 208, e.g., an assembly of circuits, and memory 210 coupled together via a bus 211 over which the various elements may interchange data and information. In some embodiments, the order processing system 200 further includes a kiosk interface 280, e.g., a dedicated kiosk interface, which is coupled to the bus 211.

Network interface 206, e.g., a wired or optical interface, includes a receiver 216 and a transmitter 218. Network interface 206 couples the order processing system 200 to a network, e.g., network 154 of FIG. 1 and/or to a sorting kiosk, e.g., sorting kiosk 128 of FIG. 1.

Wireless interface 204 includes a wireless receiver 212 coupled to receive antenna 213 via which the order processing system 200 can receiver wireless signals from other devices, e.g., including in some embodiments, a kiosk. Wireless interface 204 includes a wireless transmitter 214 coupled to a transmit antenna 215 via which the order processing system 200 can transmit wireless signals from to other devices, e.g., including in some embodiments, a kiosk. Kiosk interface 280, included in some embodiments, couples the order processing system 200 to a sorting kiosk, e.g., via a dedicated connection. Sorting kiosk interface 280 includes a receiver 282 for receiving signal from a kiosk and a transmitter 284 for transmitting signal to a kiosk.

Memory 210 includes a control routine 220, an assembly of components 222, e.g., an assembly of software components, and data/information 224.

Data/information 224 includes received orders 225, e.g., a received product order from customer 1, . . . , a received product order from customer M, orders to be processed 226, order status information 227, and sort wall information corresponding to a plurality of sort wall (sort wall 1 information 228, . . . , sort wall N information 230). Sort wall 1 information 228 includes a set of orders (order set 1) assigned to mobile sort wall 1), mobile sort wall 1 information 234, information identifying a set of robotic carts (cart set 1) assigned to pick items (products) for order set 1 244, information 246 specifying the current location of each of the carts in cart set 1, and information 248 identifying the state of mobile sort wall 1 loading status, said loading status being one of: i) empty, ii) loading in progress, iii) loaded (loading complete), iv unloading in progress (packaging in progress). In some embodiments loading status states further includes: problem detected requiring remediation.

Mobile sort wall 1 information 234 includes product to mobile sort wall 1 mapping information 234, an Identifier (ID) for mobile sort wall 1 236, order to bin position mapping information 238, and information 240 including bin size information, bin location information, and bin weight capacity information, e.g., corresponding to each of the bins of the mobile sorting wall 1, overall weigh capacity for the mobile sort wall, and maximum item size information for the mobile sorting wall 1. Mobile sort wall 1 information 234 further includes information 242 specifying the current location of mobile sort wall 1.

Sort wall N information 230 includes a set of orders (order set N) assigned to mobile sort wall N) 252, mobile sort wall N information 254, information identifying a set of robotic carts (cart set N) assigned to pick items (products) for order set N 264, information 266 specifying the current location of each of the carts in cart set N, and information 268 identifying the state of mobile sort wall N loading status, said loading status being one of: i) empty, ii) loading in progress, iii) loaded (loading complete), iv) unloading in progress (packaging in progress). In some embodiments loading status states further includes: problem detected requiring remediation.

Mobile sort wall N information 254 includes product to mobile sort wall N mapping information 255, an Identifier (ID) for mobile sort wall N 256, order to bin position mapping information 258, and information 250 including bin size information, bin location information, and bin weight capacity information, e.g., corresponding to each of the bins of the mobile sorting wall N, overall weigh capacity for the mobile sort wall N, and maximum item size information for the mobile sorting wall N. Mobile sort wall N information 254 further includes information 262 specifying the current location of mobile sort wall N.

Figure 3:
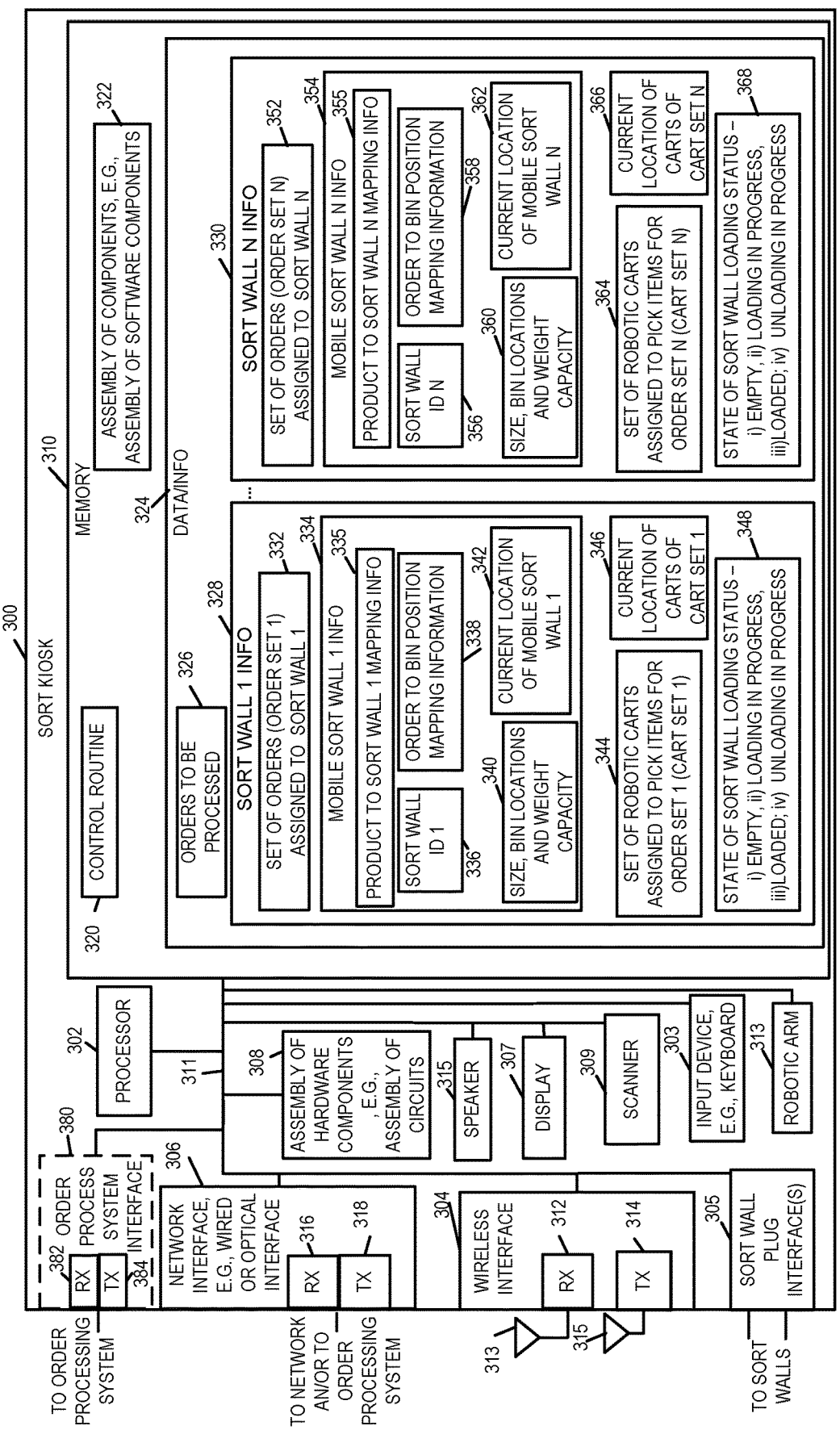
FIG. 3 illustrates an exemplary sort kiosk that is used in some embodiments of the system of FIG. 1.

FIG. 3 illustrates an exemplary sort kiosk 300 in accordance with an exemplary embodiment. Sort kiosk 300 can be, and sometimes is, used in system 100 of FIG. 1. Sort kiosk 300 is, e.g., sorting kiosk 128 of FIG. 1 and/or sort kiosk 406 of FIG. 4. Sorting kiosk 300 implements steps of a method, e.g., steps of the method of flowchart 500 of FIG. 5.

Sort Kiosk 300 includes a processor 302, e.g., a CPU, an input device 303, e.g., a keyboard, a wireless interface 304, a sort wall plug interface(s) 305, a network interface 306, a display 307, a speaker 315, an assembly of hardware components 308, e.g., an assembly of circuits, a scanner 309, a robotic arm 313, and memory 310 coupled together via a bus 311 over which the various elements may interchange data and information. In some embodiments, the display 307 is a touchscreen display which serves as both an input device and an output device. In some embodiments, the sort kiosk 300 further includes an order processing system interface 380, e.g., a dedicated order processing system interface, which is coupled to the bus 311.

Network interface 306, e.g., a wired or optical interface, includes a receiver 316 and a transmitter 318. Network interface 306 couples the sort kiosk 300 to a network, and/or to a sorting order processing system, e.g., order processing system 102 of FIG. 1.

Wireless interface 304 includes a wireless receiver 312 coupled to receive antenna 313 via which the sort kiosk 200 can receiver wireless signals from other devices, e.g., including in some embodiments, an order processing system. Wireless interface 204 includes a wireless transmitter 314 coupled to a transmit antenna 315 via which the sort kiosk 300 can transmit wireless signals from to other devices, e.g., including in some embodiments, an order processing system. Order processing interface 380, included in some embodiments, couples the sort kiosk 300 to an order processing system, e.g., via a dedicated connection. Order processing interface 380 includes a receiver 382 for receiving signals from an order processing system and a transmitter 284 for transmitting signals to an order processing system.

Sort wall plug interface(s) 305 includes plug(s) for plugging connecting mobile sort walls to the sort kiosk 300. In some embodiments, the kiosk can automatically detect when a particular mobile sort wall is plugged into one of its sort wall plugs. Sort wall plug interface 305 allows the kiosk to interface with the sort wall, e.g., controlling a particular light to be illuminated to identify a particular bin of the sort wall into which an operator is to place a product, receiving sensor input, e.g. press of a button activating a switch, etc. The sort kiosk 300 can detect the presence of a sort wall when a sort wall is plugged into the kiosk via the plug interface 303 or wirelessly connects to the kiosk. Similarly removal of a sort wall filled with orders can be detected automatically by the kiosk detecting the unplugging of the sort wall from the kiosk or wireless communication with the sort wall being lost due to the sort wall being moved away from the kiosk 300.

Scanner 309 is used to scan information, e.g. bar code or QR code information, included on products to be placed on the a mobile sort wall, e.g., to identify the product. In some embodiments, robotic arm 313 may be, and sometimes is, used to automatically remove an item (product) from a mobile robotic pick cart, place the item under the scanner 309 and then place the item in the correct bin on the mobile sort wall after scanning with the processor of the kiosk controlling placement based on which item was scanned. In some embodiments, the robotic arm is fully automated. In other embodiments, the robotic arm is semi-automated, e.g., requiring some operator interaction. In some embodiments, kiosk 300 includes multiple scanners. In some embodiments, the sort kiosk may be, and sometimes is, temporarily docked, e.g., physically locked in a predetermined orientation, to a mobile sort wall such that there is a known predetermined relationship between the robotic arm of the sort kiosk and each of the bins of the mobile sort wall.

Memory 310 includes a control routine 320, an assembly of components 322, e.g., an assembly of software components, and data/information 324. The control routine 320, when executed by the processor of the sort kiosk 300, controls the sort kiosk 300 to perform the steps of the method shown in various figures which are performed by the sort kiosk 300.

Data/information 324 includes orders to be processed 326, and sort wall information corresponding to a plurality of sort wall (sort wall 1 information 328, . . . , sort wall N information 330). Sort wall 1 information 328 includes a set of orders (order set 1) assigned to mobile sort wall 1) and information on the items in each order, mobile sort wall 1 information 334, information identifying a set of robotic carts (cart set 1) assigned to pick items (products) for order set 1 344, information 346 specifying the current location of each of the carts in cart set 1, and information 348 identifying the state of mobile sort wall 1 loading status, said loading status being one of: i) empty, ii) loading in progress, iii) loaded (loading complete), iv unloading in progress (packaging in progress). In some embodiments loading status states further includes: problem detected requiring remediation.

Mobile sort wall 1 information 334 includes product to mobile sort wall 1 mapping information 334 which indicates where products should be placed to satisfy one or more orders, an Identifier (ID) for mobile sort wall 1 336, order to bin position mapping information 338, and information 340 including bin size information, bin location information, and bin weight capacity information, e.g., corresponding to each of the bins of the mobile sorting wall 1, overall weigh capacity for the mobile sort wall, and maximum item size information for the mobile sorting wall 1. Mobile sort wall 1 information 334 further includes information 342 specifying the current location of mobile sort wall 1.

Sort wall N information 330 includes a set of orders (order set N) assigned to mobile sort wall N) 352, mobile sort wall N information 354, information identifying a set of robotic carts (cart set N) assigned to pick items (products) for order set N 364, information 366 specifying the current location of each of the carts in cart set N, and information 368 identifying the state of mobile sort wall N loading status, said loading status being one of: i) empty, ii) loading in progress, iii) loaded (loading complete), iv) unloading in progress (packaging in progress). In some embodiments loading status states further includes: problem detected requiring remediation.

Mobile sort wall N information 354 includes product to mobile sort wall N mapping information 255, an Identifier (ID) for mobile sort wall N 356, order to bin position mapping information 358, and information 350 including bin size information, bin location information, and bin weight capacity information, e.g., corresponding to each of the bins of the mobile sorting wall N, overall weigh capacity for the mobile sort wall N, and maximum item size information for the mobile sorting wall N. Mobile sort wall N information 354 further includes information 362 specifying the current location of mobile sort wall N.

In various embodiments, kiosk 300 is a mobile kiosk mounted on wheels. In some such embodiments, kiosk 300 includes a motor, e.g. an electric motor, for driving at least some of the wheels.

Figure 4:
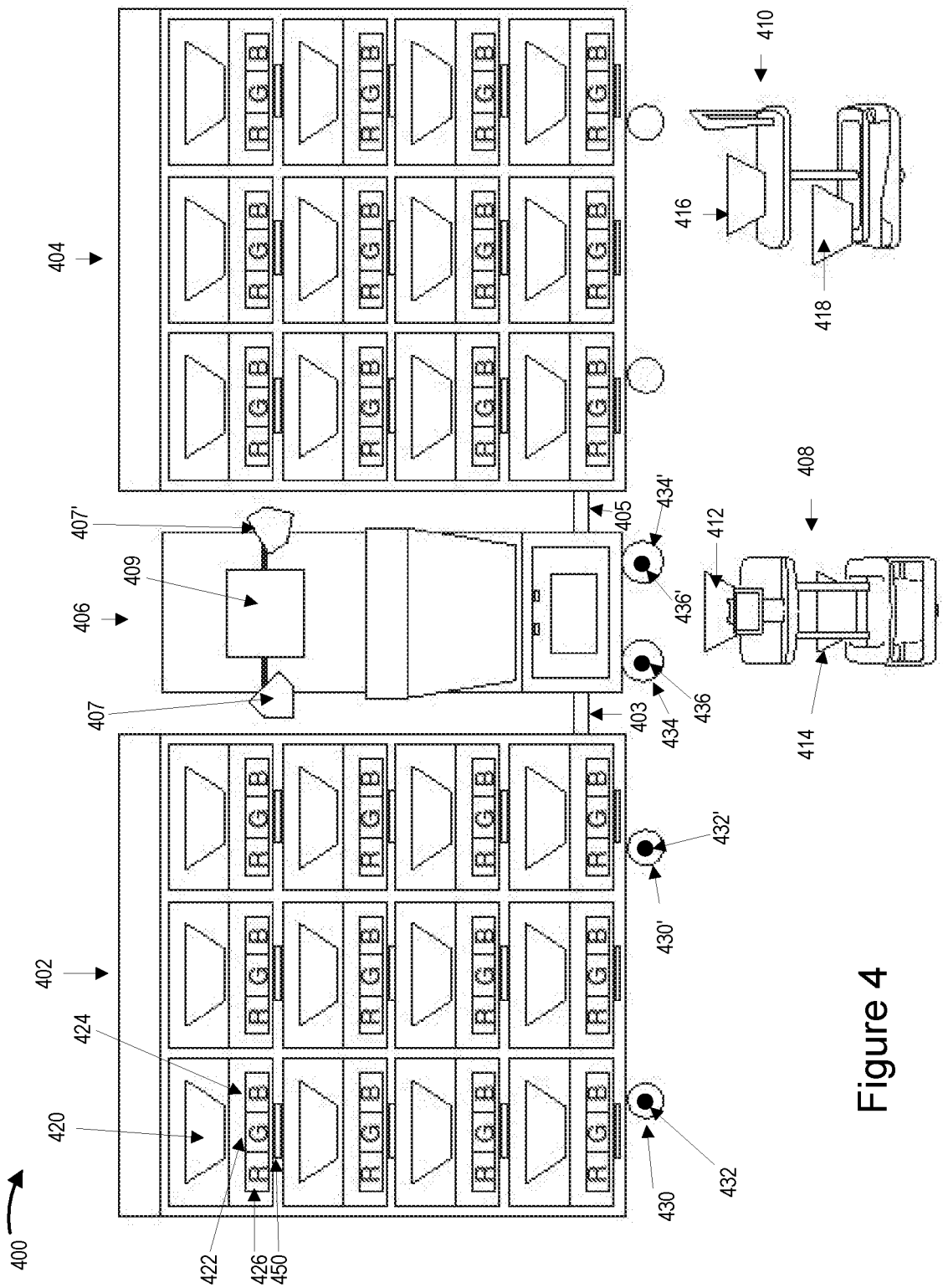
FIG. 4 shows an exemplary version of the system of FIG. 1 with items being loaded onto a mobile sort wall from a mobile robotic cart with various features of the mobile sort wall including wheels, lights under bins and buttons to signal placing of an item in a bin being visible in the figure.

FIG. 4 is drawing 400 illustrating an exemplary sorting kiosk 406 coupled to exemplary mobile sort walls (first mobile sort wall 402, second mobile sort wall 404), via kiosk to sort wall plug in cables (403, 405), respectively. The sorting kiosk 406 of FIG. 4 is, e.g., sorting kiosk 300 of FIG. 3 or sorting kiosk 128 of FIG. 1. The mobile sort walls 402, 404 are, e.g., any of the mobile sort walls (114, 115, 116, . . . , 117) of FIG. 1 and/or a mobile sort wall in accordance with mobile sort wall 600 of FIG. 6. Drawing 400 of FIG. 4 further illustrates mobile robotic pick carts (408, 410) from a set of pick carts, e.g., assigned to collect products to be placed on first mobile sort wall 402, e.g., in a queue. Mobile pick cart 408 includes totes 412 and 414, each tote including collected products, each collected product to be scanned at the kiosk, and placed in the appropriate location on the sort wall 402, e.g., as identified by an illuminated light, e.g., a illuminated green light under the tote corresponding to the correct location. Similarly mobile pick cart 410 includes totes 416 and 418, each tote including collected products, each collected product to be scanned at the kiosk, and placed in the appropriate location on the sort wall 402, e.g., as identified by an illuminated light, e.g., a illuminated green light under the tote corresponding to the correct location.

In this example, each sort wall includes 12 bins, and each bin corresponds to an order. Exemplary bin 420 on the top row of the mobile sort wall 402 is identified. An order, e.g., corresponding to a customer, e.g. customer 1, corresponds to one or more of the 12 bins on the mobile sort wall 402. Below each bin on the sort wall, there is a green light 422, a button switch 424, and a red light 426. After a product is scanned the green light below the bin in which the product is to be placed is illuminated. Then, the operator presses the button switch below the bin into which the item was placed. If the operation was correct, the green light is turned off. If the operation is incorrect, then a red light is turned on below the bin in which the item was incorrectly placed. In some embodiments, the operator does not press a button after inserting an item into a bin on the sort wall, but a placement sensor, automatically detects that an item has been placed in a bin.

In one example, each of the 12 bins in mobile sort wall 1 402 corresponds to a different customer order (e.g., customer 1 order, customer 2 order, customer 4 order, customer 6 order, customer 8 order, customer 11 order, customer 13 order, customer 14 order, customer 15 order, customer 18 order, customer 21 order, customer 23 order), each of the 12 bins in mobile sort wall 2 404 corresponds to a different customer order (e.g., customer 3 order, customer 5 order, customer 7 order, customer 9 order, customer 10 order, customer 12 order, customer 16 order, customer 17 order, customer 19 order, customer 20 order, customer 22 order, customer order 24), and each customer order includes one or more products.

In some embodiment, each bin in a sort wall is associated with a corresponding code, e.g., a 2D or 3D code located beneath the bin, which can be, and sometimes is, scanned. Exemplary bin code 450 is below exemplary bin 420 mobile sort wall 402.

The mobile sort walls include wheels and motors, e.g., electric motors coupled to at least some of the wheels to rotate the wheels and move the mobile sort wall. First mobile sort wall 402 include wheels (430, 430') and electric motors (432, 432') respectively.

The sorting kiosk 406 includes scanners (407, 407') and display 409. The sorting kiosk 406 includes wheels (434, 434') and motors (436, 436'), e.g., electric motors, coupled to at least some of the wheels to rotate the wheels and move the sorting kiosk 406.

FIG. 4 shows an exemplary mobile sort wall system including a kiosk 406 with items being removed from a tote 412 on a robotic pick cart 408 and loaded into the sort wall 402 after scanning at the sort kiosk 406. A robotic pick cart 408 used to deliver items for placement in the sort wall is also shown in FIG. 4. The order processing system which interfaces with the kiosk 406 and sorts orders into sets, which may be a cloud based system, is not shown in FIG. 4.

Sort walls (402, 404) are mounted on wheels. Green light, e.g., green light 422, or lights are included under bins, e.g., under bin 420, and are activated after an item is scanned to show the worker the bin into which the scanned item is to be placed. If there are multiple orders into which an item can be placed, various approaches can be used to indicate where the item should be placed. In some embodiments, the kiosk controls the mobile sort wall and picks one of the locations where the sorter is to put the item and highlights that one. In some other embodiments, the kiosk controls the mobile sort wall to highlight all of the potential places they can put the item. In some embodiments, a switch, e.g., in the form of a button the sorter can press, is located under a bin and is pressed by worker after the worker places an item into the bin as proof of item insertion operation completion to the kiosk which receives a signal from the sort wall indicating that the button associated with the bin into which the item was placed was pressed. Button/switch 426 is shown under bin 420. The kiosk 406 then deactivates the light on the bin indicating that the item was to be placed in the bin. In addition or as another option, the sorter kiosk 406 can, and sometimes does, scan a 2d or 3d code to confirm the item was put into the correct location The kiosk 406 turns off the light associated with a bin in response to pressing of button, e.g., such as exemplary button 424 under exemplary bin 420, after confirming that the button corresponding to the correct bin has been pressed. If a button on an incorrect bin is pressed, in some embodiments, the flashing of light on the correct bin and/or flashing a different color light on the wrong bin, e.g., a red light such as exemplary red light 426 under exemplary bin 420, is initiated to catch a workers attention and/or an alarm is sounded. Pressing of a button on a correct bin, e.g., after an item being moved to correct bin is used to confirm correct product placement after which light under correct bin is deactivated.

Once order placement in a sort wall is completed, e.g., all the items for the wall have been loaded into the bins corresponding to the individual orders, the mobile sort wall is decoupled from the mobile kiosk and the loaded sort wall moved to a packaging area, e.g., packing area 108 in FIG. 1, for final packing of sorted orders, e.g., placement of the items from a bin or bins corresponding to an order into a box or boxes for shipping. If there were any errors the sort wall may be, and sometimes is, brought to an intermediate area, such as a order remedy area, e.g., remediation area 109 in FIG. 1, which may be thought of as a hospital area, where the errors are corrected.

In some, but not necessarily all embodiments, the kiosk 406 includes wired or wireless interfaces which are coupled to a sort wall as a new empty sort wall is moved into place next to the kiosk and which are disconnected when the mobile sort wall is removed, e.g., to a packing area. Each mobile sort wall includes a wired or wireless interface, processor input devices, e.g., strip of buttons under bin positions, and output devices, e.g., strip of lights under bin positions. The kiosk controls the lights to indicate where a product should be placed and receives input, e.g., the pressing of a button, from the sort wall. Instead of buttons the sort wall can include one or more sensors, e.g., a light curtain wall or cameras for detecting insertion of an item into a bin in which case detection of placement of an item is a bin is checked as if a button indicating item placement in a bin was detected. The bin can alternately be associated with a location or bin 2d or 3d code, e.g., exemplary bin code 450 under exemplary bin 420, which is scanned by a wired or preferably wireless bar code scanner, ideally worn, such as a ring-scanner.

Communized robotic carts are used to lead workers around to pick items and deliver them to the sort wall, e.g., with a set of carts being assigned to pick items needed to complete an individual mobile sort wall. The sort walls can include batteries and drive motors allowing the sorts walls to be moved in an automated manner just as the robotic carts are able to move and lead a work to perform a pick and then travel to the sort wall or a pick cart staging area without the need for a worker to guide the mobile cart. The sort wall may be, and sometimes is, plugged into an outlet to a main power source in the building, or it may be, and sometimes is, battery powered with the battery powering a computer and other electronics without the need of a dedicated electrical drop.

Orders which are consolidated may be, and sometimes, are received via a network or communications cloud, e.g., the Internet, consolidated by an order processing system into a set of orders which can fit on a sort wall and assigned to a set of robotic pick carts used to collect the items for the set of orders. Processing of multiple order sets may occur in parallel facilitating efficient use of the sort wall with pick operations and sort wall loading operations taking different amounts of time for the same order.

The order processing and consolidation system includes memory, a processor, various interfaces and communicate with the kiosk used to control sorting of orders. The order processing system loads information in the kiosk about individual sets of orders with the kiosk then controlling sorting and signaling of where to place items in a mobile sort wall as the robotic carts corresponding to a set of orders are unloaded, scanned for sorting at the kiosk and placed in the corresponding bins of the sort wall.

Because many of the components of the system are mobile, e.g., the robotic carts, kiosk, and mobile sort walls, the system can be set up and moved relatively easily to different zones in a warehouse. Such an approach allows for the system to be efficiently deployed on an as needed basis, e.g., during high volume order seasons such as Christmas season, and/or moved in warehouse allowing for the same pick wall system to be used at different times at various locations in a warehouse. Accordingly the system offers far greater flexibility in terms of equipment utilization than fixed sort wall systems.

Figure 5A:
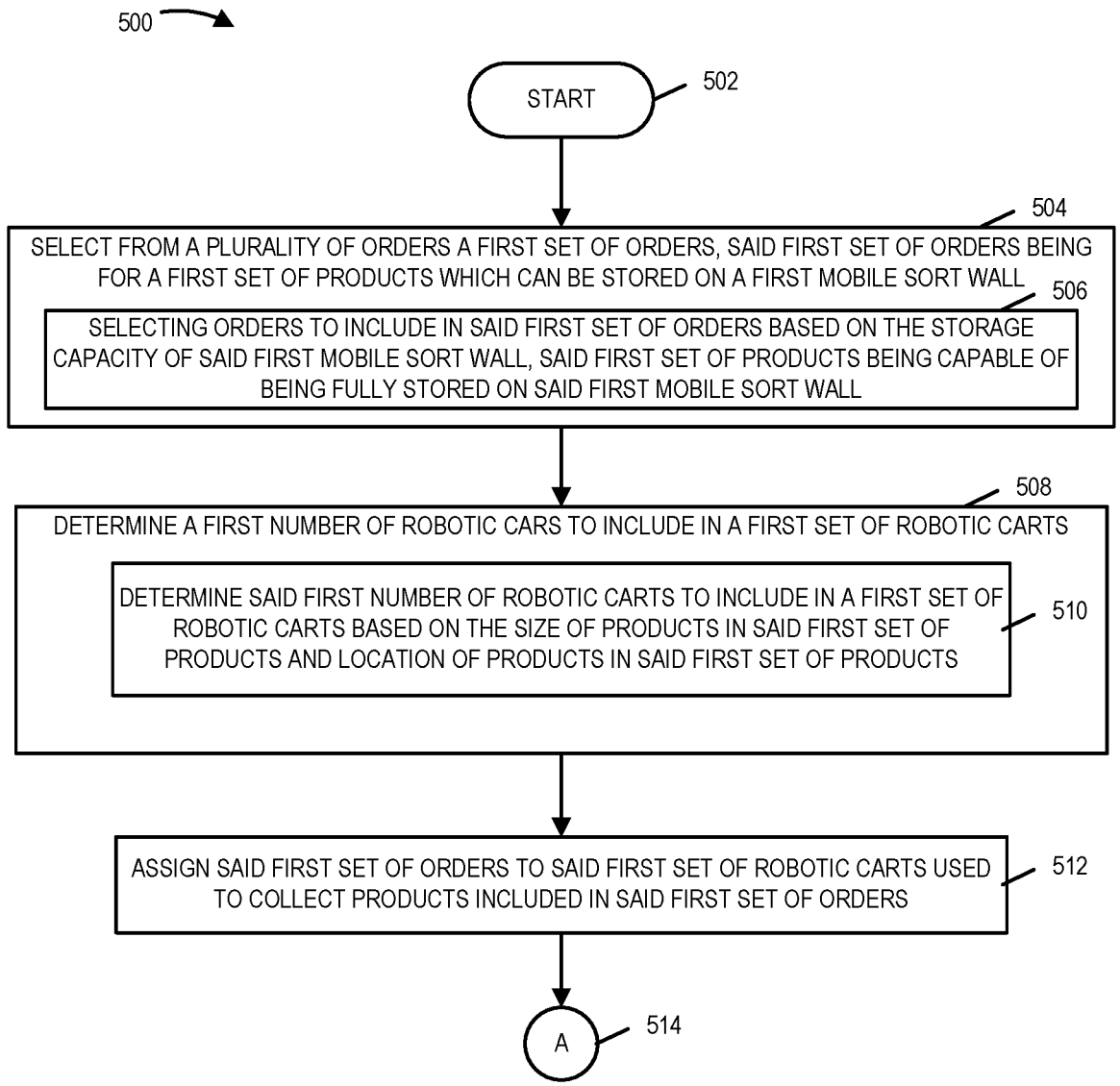
FIG. 5A is a first part of a flowchart of an exemplary order processing method in accordance with an exemplary embodiment.
Figure 5B:
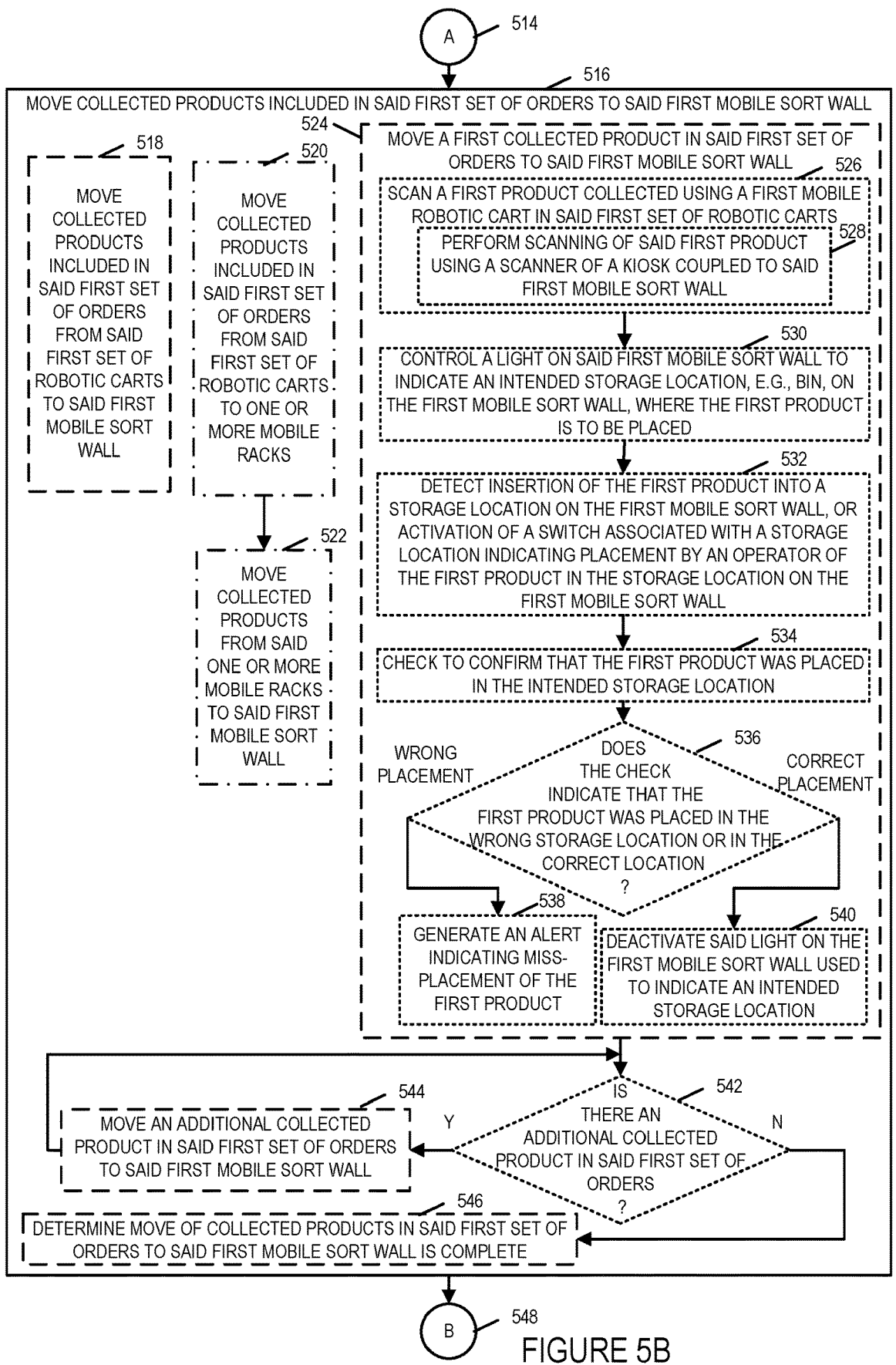
FIG. 5B is a second part of a flowchart of an exemplary order processing method in accordance with an exemplary embodiment.

FIG. 5, comprising the combination of FIG. 5A, FIG. 5B and FIG. 5C, is a flowchart 500 of an exemplary order processing method in accordance with an exemplary embodiment. Operation of the exemplary method starts in step 502, in which an exemplary order processing and consolidation system, e.g., system 100 of FIG. 1, is powered on and initialized. Operation proceeds from step 502 to step 504.

In step 504 an order processing system, e.g., order processing system 102, e.g., an order processing server, of FIG. 1, selects from a plurality of orders a first set of orders, said first set of orders being for a first set of products which can be stored on a first mobile sort wall, e.g., mobile sort wall 1

114 of FIG. 1. In various embodiments, the first mobile sort wall is mounted on wheels. In some embodiments, the first mobile sort wall includes an electric motor for driving at least some of said wheels on the first mobile sort wall. Step 504 includes step 506 in which the order processing system selects orders to include in said first set of orders based on the storage capacity of said first mobile sort wall, said first set of products being capable of being fully stored on said first mobile sort wall. Operation proceeds from step 504 to step 508.

In step 508 the order processing system determines a first number of robotic carts to include in a first set of robotic carts. Step 508 includes step 510 in which the order processing system determines said first number of robotic cars to include in said first set of robotic carts based on the size of products in said first set of products and location of products in said first set of products. Operation proceeds from step 508 to step 512.

In step 512 the order processing system assigns said first set of orders to said first set of robotic carts used to collect products included in said first set of orders. Operation proceeds from step 512, via connecting node A 514 to step 516.

In step 516, a robotic arm or a human worker moves collected products included in said first set of orders to said first mobile sort wall. In some embodiments, step 516 includes step 518 or steps 520 and 522. In step 520 a robotic arm or a human worker moves, e.g., consolidates, collected products included in said first set of orders from said first set of robotic carts to said first mobile sort wall. In step 520 a robotic arm or a human worker moves collected products included in said first set of orders from said first set of robotic carts to one or more racks, e.g., mobile racks. In some embodiments, each of the mobile racks include an electric motor for driving wheels on the mobile rack. Operation proceeds from step 520 to step 522 in which a robotic arm or a human moves collected products from one or more mobile racks to said first mobile sort wall.

In some embodiments, step 516 includes steps 524, 542, 544 and 546. In step 524 a robotic arm or a human worker moves a first product collected in said first set of orders to a first mobile sort wall. Step 524 includes steps 526, 530, 532, 534, 536, 538, and 540. In step 526 a first product, collected using a first mobile robotic cart in said first set of robotic carts, is scanned. In some embodiments, step 526 include step 528 in which the scanning of the first product is performed using a scanner of a kiosk, e.g., kiosk 128 of FIG. 1, coupled to said first mobile sort wall. For example, the robotic arm or the human worker places the first product in a area in which a code, e.g., a barcode or QR code, on the first product can be captured by the scanner of the kiosk and the scanner of the kiosk performed the scan. Operation proceeds from step 526 to said 530.

In step 530 a light, e.g., a green light, on said first mobile sort wall is controlled, e.g., by a possessor in the kiosk, to indicate an intended an intended storage location, e.g., bin, on the first mobile sort wall where the first product is to be placed. Operation proceeds from step 530 to step 532.

In step 532 insertion of the first product into a storage location on the first mobile sort wall is detected or activation of a switch associated with a storage location indicating placement by an operator, e.g., human worker, or robotic arm, of the first product in the storage location on the first mobile sort wall is detected. Operation proceeds from step 532 to step 534.

In step 534 a check is performed to confirm that the first product was placed in the intended storage location. Operation proceeds from step 534 to step 536.

In step 536 if the check indicates that the first product was placed in the wrong storage location, then operation proceeds from step 536 to step 538 in which an alert indicating miss-placement of the first product is generated. However, in step 526 if the check indicates that the first product was placed in the correct storage location, then operation proceeds from step 536 to step 540, in which said light on the first mobile sort wall used to indicate an intended storage location, is deactivated, e.g., turned off. Operation proceeds from step 526 to step 542. In step 542 a check is performed to determine if there is an additional collected product in said first set of orders which has not yet been moved to the first mobile sort wall. If the determination of step 542, is that there is an additional product to be processed, then operation proceeds from step 542 to step 544 in which the robotic arm or a human worker, e.g., an operator, moves an additional collected product in said first set of orders to said first mobile sort wall. Operation proceeds from step 544 to the input of step 542. However, if the determination of step 542, is that there are not any additional products to be processed and moved to the first mobile sort wall, then operation proceeds from step 542 to step 546, in which a determination is made that the move of collected products in said first set of orders to said first mobile sort wall is complete. Operation proceeds from step 516, via connecting node B 548, to step 550.

In step 550 the first mobile sort wall is moved to a packaging area, e.g., packing area 108 in warehouse 104 of FIG. 1, after said first mobile sort wall is loaded with the collected products in said first set of orders. Operation proceeds from step 550 to step 552.

In step 552 the first mobile sort wall, mobile sort wall 1 114 is replaced with a second mobile sort wall, e.g., mobile sort wall 2 115. Step 552 includes step 554 in which the kiosk is operated to automatically detect removal of said first mobile sort wall and connection of the second mobile sort wall to said kiosk. Operation proceeds from step 552 to step 556.

In step 556 the order processing system selects from a plurality of orders a second set of orders, said second set of orders being for a second set of products which can be stored on the second mobile sort wall. Operation proceeds from step 556 to step 558.

In step 558 the order processing system determines a second number of robotic cars to include in a second set of robotic carts based on the size of products in said second set of products and location of products in said second set of products. In some embodiments, the second number of robotic carts is different from the first number of robotic carts. Operation proceeds from step 558 to step 560.

In step 560 the order processing system assigns said second set of orders to said second set of robotic carts used to collect products included in said second set of orders. Operation proceeds from step 560 to step 562.

In step 562, a robotic arm or a human worker moves collected products included in said second set of orders to said second mobile sort wall. Operation proceeds from step 562 to step 564.

In step 564 the second mobile sort wall is moved to the packaging area after said second mobile sort wall is loaded with the collected products in said second set of orders. Operation proceeds from step 564 to step 566 in which the second mobile sort wall is replaced with another mobile sort wall. Operation proceeds from step 566 to step 568.

In step 568 the steps of selected a set of orders, determining a number of robotic carts, assigning said set of orders to the robotic carts, moving products to said another mobile sort wall, moving said another mobile sort wall to the packaging area, and replacing said another mobile sort wall with yet another mobile sort wall, are performed.

Step 568 is performed repetitively, e.g. with each iteration corresponding to processing related to a mobile sort wall.

In some embodiments, said kiosk controls a mobile sort wall (e.g., first or second mobile sort wall) to indicate storage locations for products based on product storage location information provided by an order processing system which selects the orders to be included in said first and second sets of orders, said order processing system providing different product placement maps for said first and second mobile sort walls to control placement of said first set of products in said first mobile sort wall and said second set of products in said second mobile sort wall.

In some embodiments, more sets of robotic carts are being used to collect products corresponding to different mobile sort walls than there are mobile sort walls being loaded at any given time.

Figure 6:
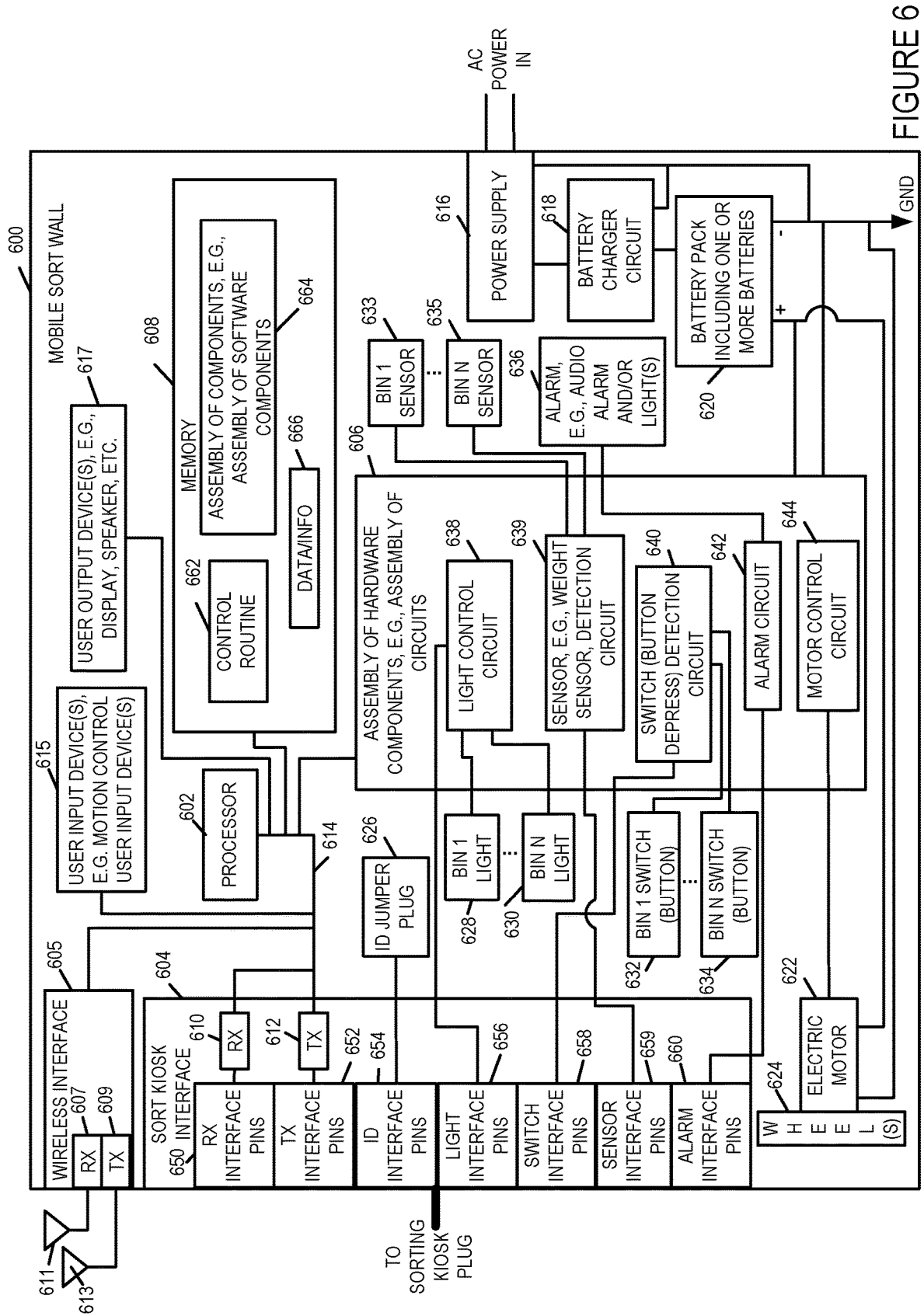
FIG. 6 is a drawing of an exemplary mobile sort wall in accordance with an exemplary embodiment.

FIG. 6 is a drawing of an exemplary mobile sort wall 600 in accordance with an exemplary embodiment. Exemplary sort wall 600 is, e.g., one of the mobile sort walls (mobile sort wall 114, mobile sort wall 2 115, mobile sort wall 3 116, . . . , mobile sort wall X 177) of FIG. 1, a mobile sort wall of FIG. 4, a mobile sort wall described with respect to the method of flowchart 500 of FIG. 5 and/or a mobile sort wall described with respect to any of the Figures.

Exemplary sort wall 600 includes a processor 602, e.g., a CPU, a sort kiosk interface 604, a wireless interface 605, an assembly of hardware component 606, e.g., an assembly of circuits, memory 608, user input device(s) 615, and user output device(s) 617 coupled together via a bus 614 over which the various elements may interchange data and information.

Mobile sort wall 600 further includes a power supply 616, which receives AC input power, a battery charger circuit 618, and a battery pack 620 including one or more batteries 620. The power supply 616 receives AC input power when plugged in and supplies power to the battery charger circuit, which monitors battery pack charge level, and supplies power to the batter pack to charger the batteries in the battery pack. In some embodiments, the power supply 616 power converts the input AC voltage to one or more DC voltages. In some embodiments, the power supply 616 powers at least some circuits within mobile sort wall 600, when plugged into an AC outlet, e.g., instead of using stored battery power to power the circuits. In some embodiments, mobile sort wall is plugged into AC power while the mobile sort wall is positioned in the vicinity of the sorting kiosk.

Mobile sort wall 600 further includes wheels 624 and an electric motor 622 coupled to one or more of the wheels 624.

In various embodiments, the mobile sort wall 600 relies on stored battery power from battery pack 620 to drive the electric motor 622, coupled to one or more wheels 624, to move the mobiles sort wall 600 from one location to another location, e.g. within a warehouse.

Wireless interface 605 includes a wireless receiver 607 coupled to receive antenna 611, via which the mobile sort wall 600 may receive wireless signals from other devices, e.g., a sorting kiosk. Wireless interface 605 further includes a wireless transmitter 609 coupled to transmit antenna 613, via which the mobile sort wall 600 may transmit wireless signals to other devices, e.g., a sorting kiosk.

Exemplary sort wall interface 604, e.g., a dedicated interface, plugs into a cable which plugs into a sorting kiosk plug. Sort kiosk interface 604 includes receiver interface pins 650 coupled to receiver 610 included in the interface 604, and the receiver 610 is coupled to bus 614. Sort kiosk interface 604 further includes transmitter interface pins 652 coupled to transmitter 612 included in the interface 604, and the transmitter 610 is coupled to bus 614. Sort kiosk interface 604 further includes ID interface pins 654, light interface pins 656, switch interface pins 658, sensor interface pins 659 and alarm interface pins 660.

Mobile sort wall 600 further includes an ID jumper plug 626, bin lights (bin light 1 628, . . . , bin light N 630), bin switches (bin 1 (button) switch 632, . . . , bin N button switch 634), bin sensors (bin 1 sensor 633, . . . , bin N sensor 635) and an alarm 636, e.g., an audio alarm and/or a light(s) alarm. Assembly of hardware components 606 includes a light control circuit 638, a sensor, e.g., weight sensor, detection circuit 629, a switch (button depress) detection circuit 640 an alarm circuit 642, and a motor control circuit 644.

User input device(s) 615 include, e.g., mobile sort wall motion control user input devices, e.g., a motor on/off switch, a steering control input, and a speed control input. User output device(s) 617 include, e.g., a display for display instructions, messages, warning, directions for moving the mobile sort wall, e.g., including a map showing the position of the mobiles sort wall, the route and the destination, and a speaker for outputting audio messages, commands, warnings, etc., to an operator. In some embodiments, the display includes a touch screen and the display serves as both an input and output device.

ID jumper plug 626 is connected to the ID interface pins 654 of the sort kiosk interface 650 and is used to communicate a unique ID address corresponding to mobile sort wall 600 to the sort kiosk. Different mobile sort walls in the warehouse have different ID jumper plugs. In one embodiment, one of the ID interface pines 654 is a kiosk ground pin, and the ID jumper plug connects 0 or more other pins of the ID interface pins to the ground pin to provide a unique ID address to the sorting kiosk. In some embodiments, in place of and/or in addition to ID jumper plug 626, the mobile sort wall transmits its ID via transmitter 612 and/or transmitter 609, e.g., to the sort kiosk.

The light interface pins 656 are coupled to the light control circuit 638 and the output of the light control circuit 638 is coupled to the bin lights (bin light 1 628, . . . , bin light N 630). In some embodiments, the kiosk sends a signal via the light interface pins 656, which identifies one of the bin lights (bin light 1 628, . . . , bin light N 630), e.g., green lights, located below each bin, to be illuminated, to identify the particular bin of the mobile sort wall 600 into which a product is to be inserted. The light control circuit 638 receives the signal and illuminates the particular light corresponding to the bin. In some embodiments, the kiosk sends a signal to turn off the light after the product has been inserted into the correct bin, and the light control circuit 638 turns off the light.

In some embodiments, after an operator inserts a product into a particular bin, the operator presses a bin switch (button), which is one of the switches (bin 1 switch 632, . . . , bin N switch 630) associated with the particular bin, e.g., a momentary button type switch located below the bin, and switch (button press) detection circuit 640 detects which switch has been depressed and sends information identifying the bin corresponding to the depressed switch to the kiosk via switch interface pins 658. The kiosk can use the received information to confirm that the product has been placed in the correct bin.

In some embodiments, after a product has been placed into a particular bin, e.g., by an operator or a robotic arm, a sensor, e.g., a weight sensor, detects, that an object has been placed in a particular bin, e.g., via a change in weight corresponding to the bin. Product placement detection sensors, e.g., weight sensors, (bin 1 sensor 633, . . . , bin N sensor 635) are associated with each of the bins of the mobile sort wall 600. Sensor detection circuit 639, which is monitoring the sensors (633, . . . , 635) receives a signal from one of the sensors (633, . . . , 635) and identifies the particular bin into which a product has been placed, and communicates the information to the kiosk via sensor interface pins 659, allowing the kiosk to determine if the product has been placed in the correct bin of the mobile sort wall.

Alarm interface pins 660 receive an alarm signal, e.g. a warning signal indicating that a product has been placed in an incorrect bin. The alarm interface pins 660 of the sort kiosk interface 604 are coupled to the alarm circuit, which output signal(s) to activate one or more alarms 636. Exemplary alarms include, a siren, buzzer, audio message, flashing warning light, and/or warning light, e.g., red warning light, located under the bin into which the product was incorrectly placed.

Memory 608 includes a control routine 662 and an assembly of components, e.g., assembly of software components 664, e.g., software modules or routines, and data/information 666.

Motor control circuit 644 controls the electric motor 622 to operate and apply power, e.g., at a commanded or selected level, to rotate one or more wheels of the mobile sort wall 600 to move the mobile sort wall. In some embodiments, the mobile sort wall also includes one or more electric motors or actuators used for steering control, which are also driven by motro control circuit 644.

In some embodiments, the mobile sort wall 600 ca be, and sometimes is, coupled to the sort kiosk via one or wireless interface 605 or sort wall interface. In some embodiments, when the wireless interface is used instead of the sort kiosk interface 604, information which would be communicated over the pins of the sort wall interface is converted to data, included in wireless messages and sent or received over the wireless interface 605, e.g., under control of the processor 602 implementing routines in memory 608.

In some embodiments, one of more of the light control circuit 638, sensor detection circuit 639, switch detection circuit 640, and alarm circuit 642 are included within the sorting kiosk instead of within the mobile sort wall 600, e.g., with the sorting kiosk being coupled directly to a light, sensor, switch, or alarm directly via the sort kiosk interface 604.

Figure 7:
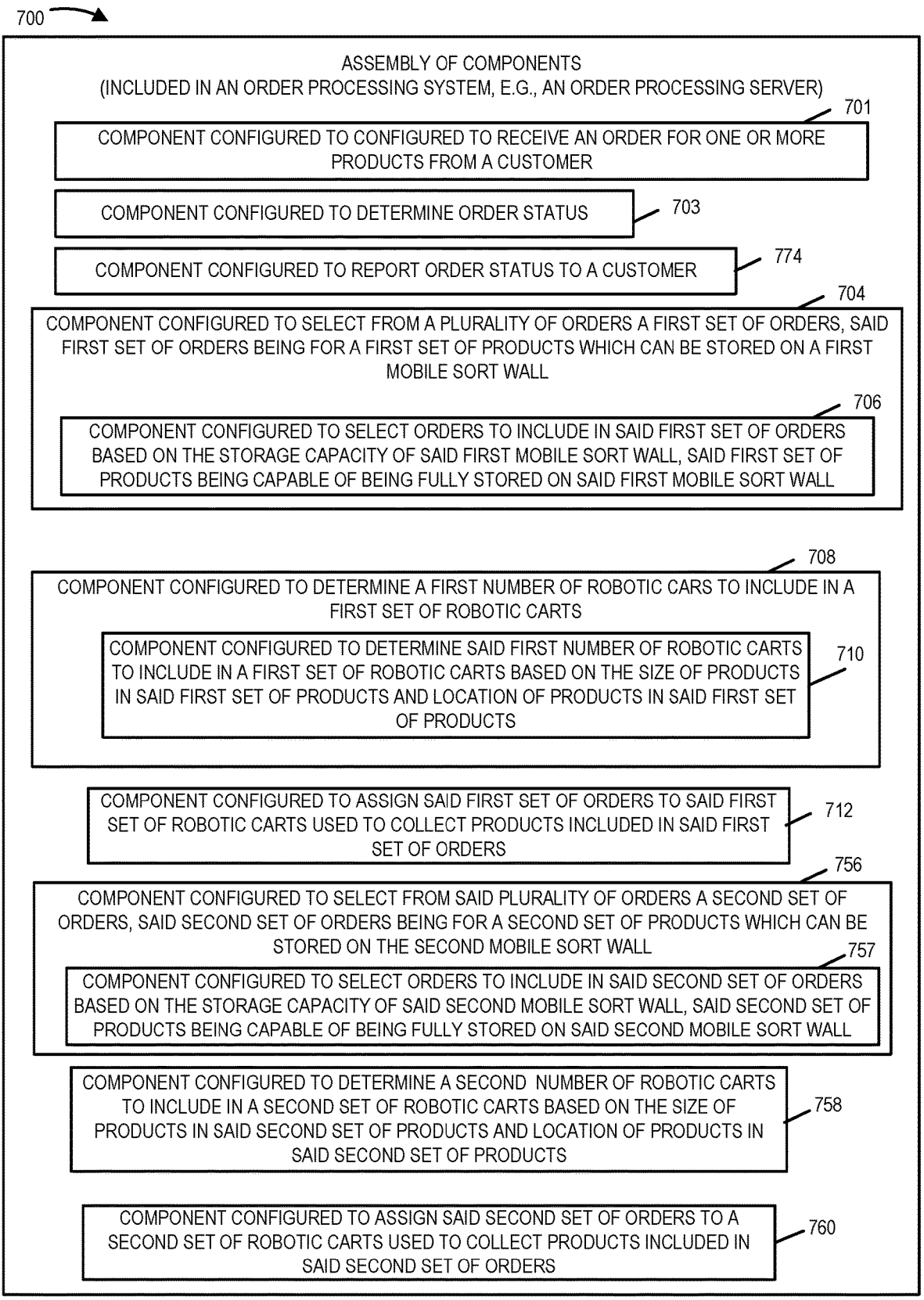
FIG. 7 is a drawing of an exemplary assembly of components which may be included in an order processing system, e.g., an order processing server, in accordance with an exemplary embodiment.

FIG. 7 is a drawing of an exemplary assembly of components 700 which may be included in an order processing system, e.g., an order processing server, in accordance with an exemplary embodiment. Assembly of components 700 is, e.g., included in the order processing system 102 of FIG. 1 and/or the order processing system 200 of FIG. 2, e.g., an order processing server.

The components in the assembly of components 700 can be, and in some embodiments are, implemented fully in hardware within the processor 202, e.g., as individual circuits. The components in the assembly of components 700 can, and in some embodiments are, implemented fully in hardware within the assembly of components 208, e.g., as individual circuits corresponding to the different components. In other embodiments some of the components are implemented, e.g., as circuits, within the processor 202 with other components being implemented, e.g., as circuits within assembly of components 208, external to and coupled to the processor 202. As should be appreciated the level of integration of components into the processor 202 and/or with some components being external to the processor 202 may be one of design choice. Alternatively, rather than being implemented as circuits, all or some of the components may be implemented in software and stored in the memory 210 of the order processing system, e.g., order processing server, with the components controlling operation of the order processing system to implement the functions corresponding to the components when the components are executed by a processor, e.g., processor 202. In some such embodiments, the assembly of components 700 is included in the memory 210 as assembly of components 222. In still other embodiments, various components in assembly of components 700 are implemented as a combination of hardware and software, e.g., with another circuit external to the processor providing input to the processor 202 which then under software control operates to perform a portion of a component's function. While processor 202 is shown in the FIG. 2 embodiment as a single processor, e.g., computer, it should be appreciated that the processor 202 may be implemented as one or more processors, e.g., computers.

When implemented in software the components include code, which when executed by the processor 202, configure the processor 202 to implement the function corresponding to the component. In embodiments where the assembly of components 700 is stored in the memory 210, the memory 210 is a computer program product comprising a computer readable medium comprising code, e.g., individual code for each component, for causing at least one computer, e.g., processor 202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the order processing system 200, e.g., an order processing server, or elements therein such as the processor 202, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of the method of flowchart 500 of FIG. 5 and/or described or shown with respect to any of the other figures.

Assembly of components 700 includes a component 701 configured to receive an order for one or more products from a customer, a component 703 configured to determine order status and a component 774 configured to report order status to a customer. Assembly of components 700 further includes a component 704 configured to select from a plurality of orders a first set of orders, said first set of orders being for a first set of products which can be stored on a first mobile sort wall. Component 704 includes a component 706 configured to select orders to include in said first set of orders based on the storage capacity of said first mobile sort wall, said first set of products being capable of being fully stored on the first mobile sort wall. Assembly of components 700 further includes a component 708 configured to determine a first number of robotic carts to include in a first set of robotic carts. Component 708 includes a component 710 configured to determine said first number of robotic carts to include in said first set of robotic carts based on the size of products and location of products in said first set of products. Assembly of components 700 further includes a component 712 configured to assign said first set of orders to said first set of robotic carts used to collect products in said first set of orders.

Assembly of components 700 further includes a component 756 configured to select from a plurality of orders a second set of orders, said second set of orders being for a second set of products which can be stored on a second mobile sort wall. Component 756 includes a component 757 configured to select orders to include in said second set of orders based on the storage capacity of said second mobile sort wall, said second set of products being capable of being fully stored on the second mobile sort wall. Assembly of components 700 further includes a component 758 configured to determine a second number of robotic carts to include in a second set of robotic carts based on the size of products and location of products in said second set of products. Assembly of components 700 further includes a component 760 configured to assign said second set of orders to said second set of robotic carts used to collect products in said second set of orders.

Figure 8A:
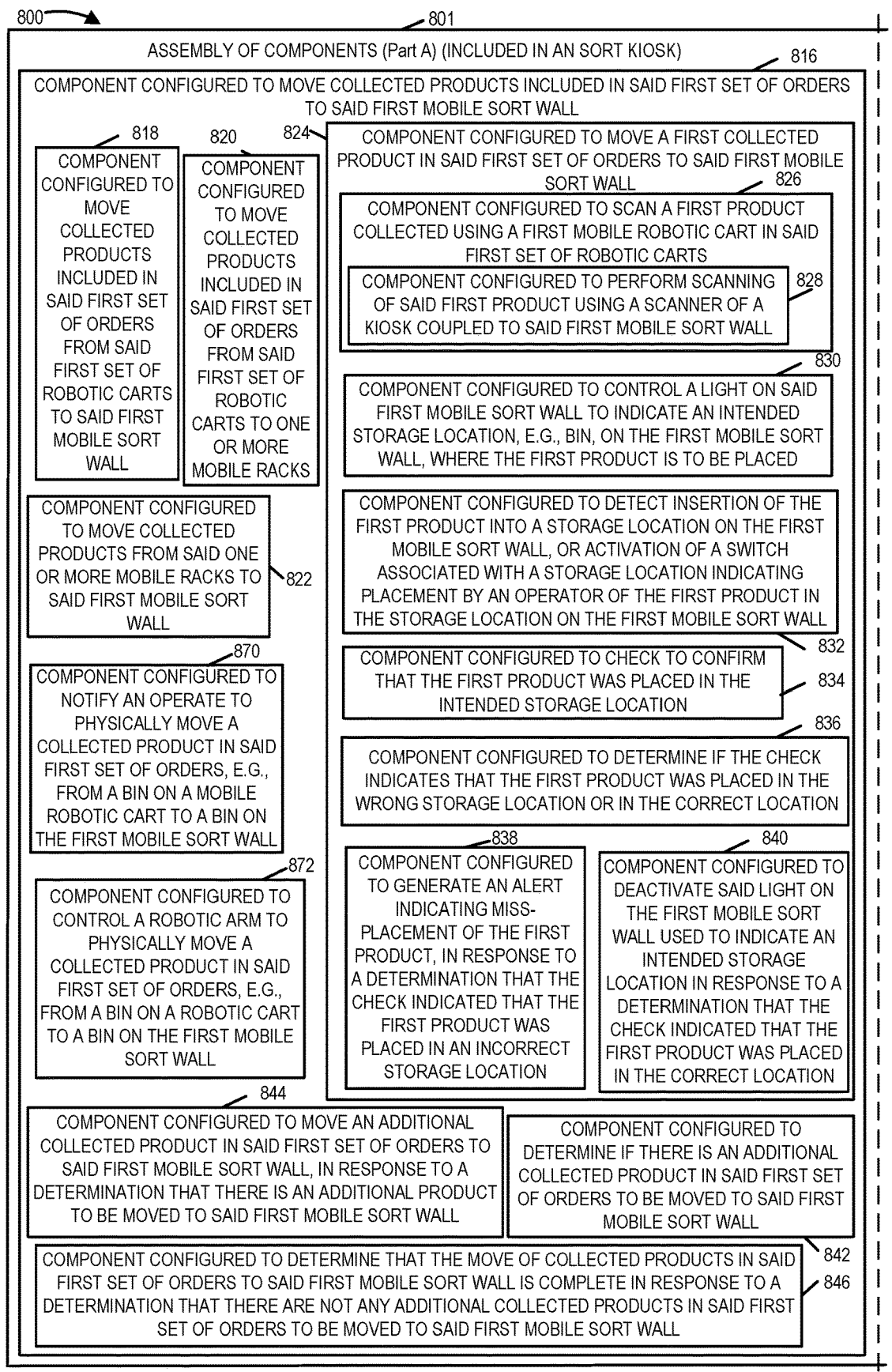
FIG. 8A is a drawing of a first part of an exemplary assembly of components which may be included in a sort kiosk, in accordance with an exemplary embodiment.
Figures 8, 8B:
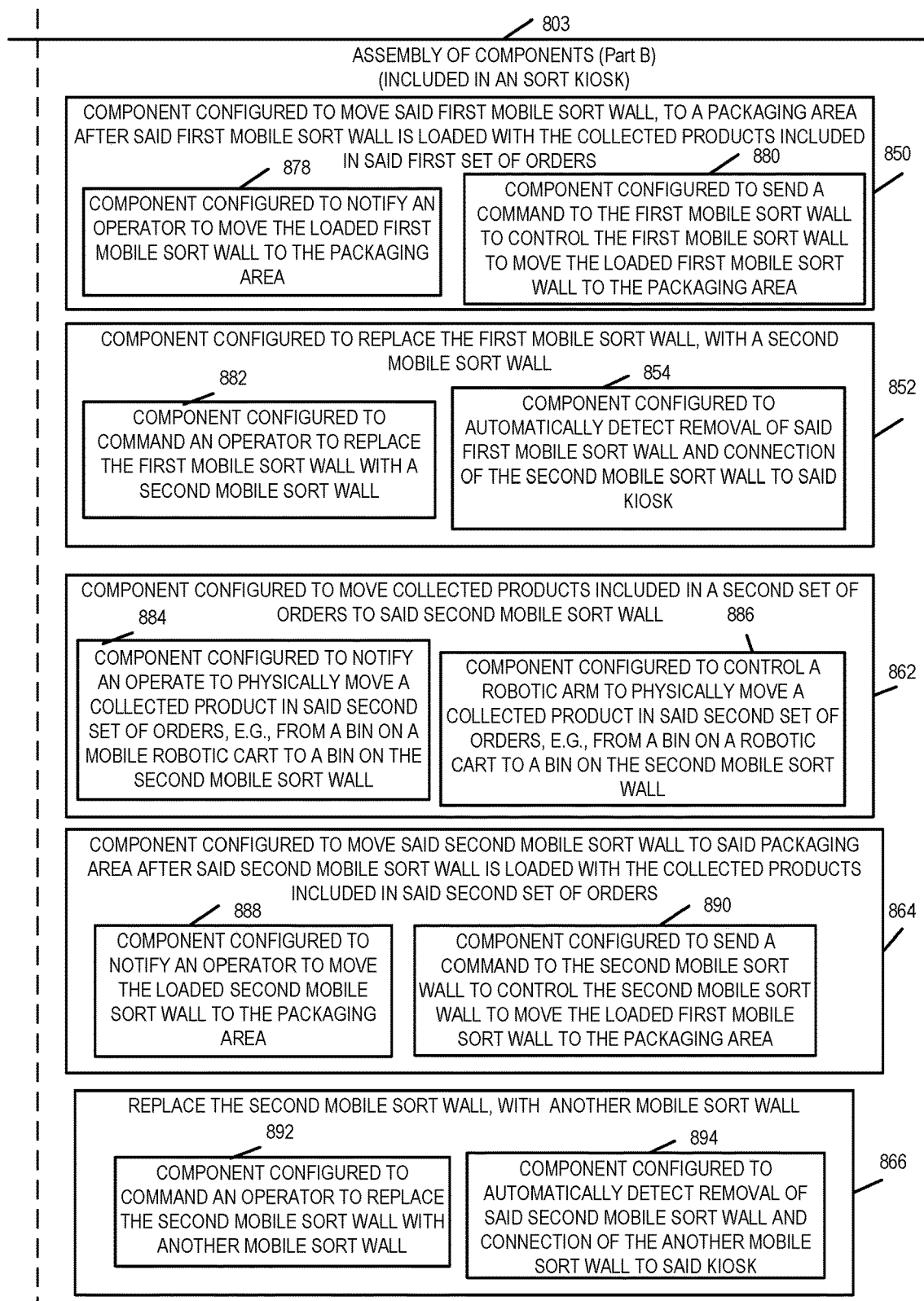
FIG. 8B is a drawing of second part of an exemplary assembly of components which may be included in a sort kiosk, in accordance with an exemplary embodiment.
FIG. 8 comprises the combination of FIG. 8A and FIG. 8B.

FIG. 8, comprising the combination of FIG. 8A and FIG. 8B, is a drawing of an exemplary assembly of components 800, comprising the combination of Part A 801 and Part B 803, which may be included in a sort kiosk, in accordance with an exemplary embodiment. Assembly of components 800 is, e.g., included in sorting kiosk 128 of FIG. 1, sort kiosk 300 of FIG. 3, and/or sort kiosk 406 of FIG. 4.

The components in the assembly of components 800 can be, and in some embodiments are, implemented fully in hardware within the processor 302, e.g., as individual circuits. The components in the assembly of components 800 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components into the processor 302 and/or with some components being external to the processor 302 may be one of design choice. Alternatively, rather than being implemented as circuits, all or some of the components may be implemented in software and stored in the memory 310 of the sorting kiosk 300, with the components controlling operation of the sorting kiosk 300 to implement the functions corresponding to the components when the components are executed by a processor, e.g., processor 302. In some such embodiments, the assembly of components 800 is included in the memory 310 as assembly of components 322. In still other embodiments, various components in assembly of components 800 are implemented as a combination of hardware and software, e.g., with another circuit external to the processor providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 800 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the sorting kiosk 300 or elements therein such as the processor 302, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of flowchart 500 of FIG. 5 and/or described or shown with respect to any of the other figures.

Assembly of components 800 includes a component 816 configured to move collected products in said first set of orders to said first mobile sort wall. Component 816 includes component 818 configured to move collected products included in said first set of orders from said first set of robotic carts to said first mobile sort wall, a component 820 configured to move collected products included in said first set of orders from said first set of robotic carts to one or more mobile racks, a component 822 configured to move collected products included in said first set of orders from said one or more mobile racks to said first mobile sort wall, a component 822 configured to notify an operator, e.g., via a message displayed on a display screen and/or via a voice command, to physically move a collected product in said first set of orders, e.g., from a bin on a mobile robotic cart to a bin on the first mobile sort wall, and a component 872 configured to control a robotic arm, e.g., a robotic arm included in the sort kiosk, to physically move a collected product from a bin on the robotic cart to a bin on the first mobile sort wall. Component 870 and/or 872 may be, and sometimes are, called by other components, e.g., component 824 and component 844 within component 816.

Assembly of components 816 further includes a component 824 configured to move a first collected product in said first set of orders to said first mobiles sort wall. Component 824 includes components 826, 830, 832, 834, 836, 838 and 840. Component 826 is a component configured to scan a first product collected using said first mobile robotic cart in said first set of robotic carts. Component 826 includes a component 828 configured to perform scanning of said first product using a scanner of a kiosk coupled to said first mobile sort wall. Component 830 is a component configured to control a light, e.g., a green light, on said first mobile sort wall to indicate an intended storage location, e.g., bin, on the first mobile sort wall, where the first product is to be placed. Component 832 is a component configured to detect the insertion of the first product into a storage location on the first mobile sort wall or activation of a switch associated with a storage location indicating placement by an operator or by a robotic arm of the first product in the storage location on the first mobile sort wall. In some embodiments, component 832 detects one or more of: a switch associated with a bin on the first mobile sort wall, e.g. button switch being depressed, a sensor activation, e.g. a weight sensor below a bin on the sort wall, detecting a change in response to product placement in the bin, or a scan of a identification code, e.g., 2D or 3D code, such as a bar code or QR code, located below the bin on the first mobile sort wall and corresponding to the bin, which was scanned by after product placement. Component 834 is a component configured to check to confirm that the first product was placed in the intended location. Component 836 is a component configured to determine if the check indicates that the first product was placed in the wrong storage location or in the correct storage location on the first mobile sort wall. Component 838 is a component configured to generate an alert indicating miss-placement of the first product, in response to a determination that the check indicated that the first product was placed in an incorrect storage location on the first mobile sort wall. In some embodiments, the alert includes tuning on a light indicating a placement error, e.g. a red flashing light on the first mobile sort wall, activating a warning alarm included in the first mobile sort wall, displaying a warning message on the display of the kiosk, sending a warning message to the first mobile sort wall, outputting a voice warning message on a speaker included in the sort kiosk and/or sending a voice warning message to the first mobile sort wall. Component 840 is a component configured to deactivate said light in the first mobile sort wall used to indicate an intended storage location in response to a determination that the check indicated that the first product was placed in the correct location, e.g. correct bin, in the first mobiles sort wall.

Component 816 further includes a component 842 configured to determine if there is an additional collected product in said first set of orders to be moved to said first mobile sort wall, a component 844 configured to move an additional collected product in said first set of orders to said first mobiles sort wall, in response to a determination that there is an additional product to be moved to said first mobile sort wall, and a component 846 configured to determine that the move of collected products in said first set of orders to said first mobile sort wall is complete in response to a determination that there are not any additional collected production in said first set of orders to be moved to said first mobile sort wall.

Assembly of components 800 further includes a component 850 configured to move said first mobile sort wall to a packaging area after said first mobile sort wall is loaded with the collected products included in said first set of orders. Component 850 includes a component 878 configured to notify an operator to move the loaded first mobile sort wall to the packaging area and a component 880 configured to send a command to the first mobile sort wall to control the first mobile sort wall to move the loaded first mobile sort wall to the packaging area. Assembly of components 800 further includes a component 852 configured to replace the first mobile sort wall with a second mobile sort wall. Component 852 includes a component 882 configured to command an operator to replace the first mobile sort wall with a second mobile sort wall, e.g., via a message displayed on a display screen of the kiosk or via a voice message output from a speaker of the kiosk, and a component 854 configured to automatically detect removal of said first mobile sort wall and connection of the second mobile sort wall to said kiosk, e.g., via monitoring and detecting changes on the plug-in kiosk to sort wall dedicated interfaces of the kiosk, and/or via receiving wireless signals from the first and second mobile sort walls.

Assembly of components 800 further includes a component 862 configured to move one or more collected products included in said second set of orders to said second mobile sort wall. Component 862 includes a component 884 configured to notify an operator to physically move a collected product in said second set of orders, e.g., from a bin on mobile robotic cart to a bin on the second mobile sort wall and a component 886 configured to control a robotic arm, e.g. a robotic arm including in said kiosk, to physically move a collected product in said second set of orders, e.g., from a bin on a robotic cars to a bin on the second mobiles sort wall.

Assembly of components 800 further includes a component 864 configured to move said second mobile sort wall to a packaging area after said second mobile sort wall is loaded with the collected products included in said second set of orders. Component 864 includes a component 888 configured to notify an operator to move the loaded second mobile sort wall to the packaging area and a component 890 configured to send a command to the second mobile sort wall to control the second mobile sort wall to move the loaded second mobile sort wall to the packaging area. Assembly of components 800 further includes a component 866 configured to replace the second mobile sort wall with another mobile sort wall. Component 866 includes a component 892 configured to command an operator to replace the second mobile sort wall with the another mobile sort wall, e.g., via a message displayed on a display screen of the kiosk or via a voice message output from a speaker of the kiosk, and a component 894 configured to automatically detect removal of said second mobile sort wall and connection of the another mobile sort wall to said kiosk, e.g., via monitoring and detecting changes on the plug-in kiosk to sort wall dedicated interfaces of the kiosk, and/or via receiving wireless signals from the second and another mobile sort walls.

NUMBERED LIST OF EXEMPLARY METHOD EMBODIMENTS

Method Embodiment 1

A method comprising: selecting (504) from a plurality of orders a first set of orders, said first set of orders being for a first set of products which can be stored on a first sort wall; assigning (512) said first set of orders to a first set of robotic carts used to collect products included in said first set of orders; and moving (516) collected products included in said first set of orders to said first sort wall.

Method Embodiment 2

The method of Method Embodiment 1, further comprising: determining (510) a number of robotic carts to include in said first set of robotic carts based on size of products in said first set of products and location of products in said first set of products.

Method Embodiment 3

The method of Method Embodiment 1, wherein said first sort wall is a first mobile sort wall.

Method Embodiment 4

The method of claim 3, wherein said step selecting (504) from a plurality of orders a first set of orders includes selecting (506) orders to includes in said first set based on the storage capacity of said first mobile sort wall, said first set of products being capable of being fully stored on said first mobile sort wall.

Method Embodiment 5

The method of Method Embodiment 3, wherein moving (506) collected products included in said first set of orders to said first sort wall includes one of: i) moving (519) collected products included in said first set of orders from said first set of robotic carts to said first mobile sort wall; or ii) moving (520), (e.g. consolidating,) collected products included in said first set of orders from said first set of robotic carts to one or more mobile racks and moving (522) the collected products from said one or more mobile racks to said first mobile sort wall.

Method Embodiment 6

The method of Method Embodiment 3, wherein said first mobile sort wall is mounted on wheels.

Method Embodiment 7

The method of Method Embodiment 6, wherein said first mobile sort wall includes an electric motor for driving at least some of said wheels.

Method Embodiment 8

The method of Method Embodiment 5, wherein each of the mobile racks include an electric motor for driving wheels on the mobile rack.

Method Embodiment 9

The method of Method Embodiment 3, further comprising: moving (550) said first mobile sort wall to a packaging area after said first mobile sort wall is loaded with the collected products included in said first set of orders.

Method Embodiment 10

The method of Method Embodiment 9, further comprising: replacing (552) said first mobile sort wall with a second mobile sort wall; and moving (562) collected products included in a second set of orders to said second mobile sort wall.

Method Embodiment 11

The method of Method Embodiment 10, further comprising, prior to moving (562) collected products included in the second set of orders to said second mobile sort wall, performing the steps of: selecting (556) from said plurality of orders said second set of orders, said second set of orders being for a second set of products which can be stored on the second mobile sort wall; and assigning (560) said second set of orders to a second set of robotic carts used to collect products included in said second set of orders.

Method Embodiment 12

The method of Method Embodiment 11, further comprising: determining (508) a first number of robotic carts to include in said first set of robotic carts based on size of products in said first set of products and location of products in said first set of products; and determining (558) a second number of robotic carts to include in said second set of robotic carts based on size of products in said second set of products and location of products in said second set of products.

Method Embodiment 13

The method of Method Embodiment 12, wherein said second number of robotic carts is different from said first number of robotic carts.

Method Embodiment 14

The method of Method Embodiment 3, wherein moving (516) collected products included in said first set of orders to said first sort wall includes: scanning (526) a first product collected using a first mobile robotic cart in said first set of robotic carts; and controlling (530) a light on said first mobile sort wall to indicate an intended storage location (e.g., bin) on the first mobile sort wall where the first product is to be placed.

Method Embodiment 15

The method of Method Embodiment 14, further comprising: detecting (532) insertion of the first product into a storage location on the first mobile sort wall or activation of a switch associated with a storage location indicating placement by an operator in the storage location on the first mobile sort wall; checking (534) to confirm that the first product was placed in the intended storage location; and generating (538) an alert indicating miss-placement of the first product when said check indicates that the first product was placed in the wrong storage location; and deactivating (540) said light on the first mobile sort wall used to indicate an intended storage location when said check confirms correct product placement on said first mobile sort wall.

Method Embodiment 16

The method of Method Embodiment 15, wherein said step of scanning (526) a first product is performed using (528) a scanner of a kiosk coupled to said first mobile sort wall, the method further comprising: operating (554) the kiosk to automatically detect removal of said first mobile sort wall and connection of the second mobile sort wall to said kiosk.

Method Embodiment 17

The method of Method Embodiment 16, wherein said kiosk controls a mobile sort wall (e.g., first or second mobile sort wall) to indicate storage locations for products based on product storage location information provided by an order processing system which selects the orders to be included in said first and second sets of orders, said order processing system providing different product placement maps for said first and second mobile sort walls to control placement of said first set of products in said first mobile sort wall and said second set of products in said second mobile sort wall.

Method Embodiment 18

The method of Method Embodiment 17, wherein more sets of robotic carts are being used to collect products corresponding to different mobile sort walls than there are mobile sort walls being loaded at any given time.

NUMBERED LIST OF EXEMPLARY SYSTEM EMBODIMENTS

System Embodiment 1

A system (100), the system (100) including: a kiosk (128) configured to control product sorting and placement of sets of products on mobile sort walls (114, 115, 116, . . . , 117) based on product to sort wall mapping information (335, . . . , 355) stored in said kiosk (128), said kiosk (128) including: memory (310) including product to sort wall mapping information (335, . . . , 355); a scanner (309) for scanning a product; a processor (302) configured to control said kiosk (128) to: detect connection of a first mobile sort wall (114); and control the first mobile sort wall (114) to indicate a location where a first product is to be placed in a first mobile sort wall (114) in response to the first product being scanned by said scanner (309).

System Embodiment 2

The system (100) of System Embodiment 1, wherein said kiosk (128) includes a robotic arm (313) for moving collected products into corresponding positions in said first mobile sort wall (114) based on said product to sort wall mapping information (335).

System Embodiment 3

The system (100) of System Embodiment 1, wherein said processor (302) is further configured to: check to confirm that the product was placed in the intended storage location in response to an indication from the first mobile sort wall (114) that the product was inserted into a storage location; generate an alert indicating miss-placement of the product when said check indicates that the product was placed in the wrong storage location; and deactivate a light on the first sort wall (114) used to indicate an intended storage location when said check confirms correct product placement on said first mobile sort wall (114).

System Embodiment 4

The system (100) of System Embodiment 1, further comprising: said first mobile sort wall (114).

System Embodiment 5

The system (100) of System Embodiment 4, wherein said first mobile sort wall (114) is mounted on wheels (624).

System Embodiment 6

The system (100) of System Embodiment 5, wherein said first mobile sort wall (114) includes an electric motor (622) for driving at least some of said wheels (624).

System Embodiment 7

The system (100) of System Embodiment 6, wherein said kiosk (128) is a mobile kiosk which is mounted on wheels.

System Embodiment 8

The system (100) of System Embodiment 7, further comprising: a plurality of robotic pick carts (120, . . . , 122).

System Embodiment 9

The system (100) of System Embodiment 8, further comprising: an order system (102) including: an interface (205 or 204) for receiving orders; and a second processor (202) configured to control said order system (102) to: select from a plurality of orders a first set of orders, said first set of orders being for a first set of products which can be stored on a first mobile sort wall; assign said first set of orders to a first set (118) of robotic carts used to collect products included in said first set of orders; and communicate product to sort wall mapping information indicating where products in said first set of products should be placed in a first mobile sort wall (114).

System Embodiment 10

The system (100) of System Embodiment 9, wherein said first mobile sort wall (114) includes: a row of lights (628, . . . , 630) under a set of storage locations, said kiosk controlling said lights to indicate where a product should be placed after a product is scanned; and a row of switches (e.g., in the form of buttons) (632, . . . 640) under said set of storage locations or sensors (633, . . . 635) which can detect placement of a product in a storage location.

System Embodiment 11

The system (100) of System Embodiment 10, wherein said first mobile sort wall (114) is configurable to include bins of different sizes; and wherein lights in said row of lights are controlled as a function of the sort wall configuration.

System Embodiment 12

The system (100) of System Embodiment 11, wherein said system (100) includes more mobile sort walls (114, 115, 116, . . . , 117) than kiosks (128).

System Embodiment 13

The system (100) of System Embodiment 12, wherein some mobile sort walls (114, 115) are attached to said kiosk (128) and being loaded at a given time while other mobile sort walls (116) are being unloaded at another location (108) as part of an order packing operation.

System Embodiment 14

The system (100) of System Embodiment 13, wherein the number of mobile sort walls in the system (100) exceeds the number of sort kiosks in the system by at least a factor of 4 to one.

Various features relate to using a sort wall, e.g., mobile sort wall, in combination with mobile pick carts, e.g., robot carts which guide a human picker through a warehouse and indicate which items are to be picked. Other features relate to separating consolidation of orders, e.g., orders to be picked, and the subsequent sorting of picked items to be placed in one or more sort walls. In various embodiments the sort walls are mobile sort walls with wheels and in come cases motors for driving the sort walls from one location to another under control of a processor included in the sort wall. The mobile sort walls are physically separate devices from a sort kiosk in some embodiments and can interface with the sort kiosk via wires, e.g., a plug interface, or wirelessly depending on the particular embodiment. The sort kiosk can and sometimes is used with more than one mobile sort wall, e.g., with one sort wall being loaded while another is being detached to the sort kiosk, e.g., after loading, or attached to the sort kiosk, e.g., prior to loading. In various embodiments lights are used on the sort wall to indicate where a picked item is to be placed and a button is operated by a person placing the item to indicate placement in a location on the sort wall corresponding to the button. The lights are controlled by the sort kiosk, e.g., in response to a picked item being scanned and ready for insertion in a location on the sort wall.

In some embodiments a sensor or camera is used to recognize a hand and/or product being placed in a location, e.g., slot, of the sort wall thereby avoiding the need for the person inserting the item to press a button corresponding to the sort wall slot which a bin corresponding to an order is placed. Slots can be configured to accept different size bins in some embodiments.

Robots and/or a robotic arm can and sometime are used to place products in corresponding locations on the sort wall. The sort wall can be and sometimes is computerized operating in a robotic manner and moving from one location, e.g., a wall loading location where a sort kiosk is located, to another location, e.g., a shipping area where the loaded sort wall is to be unloaded and the orders packaged fro shipment. The kiosk and/or sort wall may an sometimes do include a robotic arm that is used to move items to and/or from locations on a sort wall based on order location and the items to be included in an order.

The techniques of various embodiments may be implemented using software, hardware and/or a combination of software and hardware. Various embodiments are directed to apparatus, e.g., order processing systems, e.g. order processing servers, cloud servers, mobile sort walls, sorting kiosks, mobile robotic carts, warehouse devices, customer devices, e.g. computers, laptops, mobile smartphones, etc., and/or communications devices, etc. Various embodiments are also directed to methods, e.g., method of controlling and/or operating a system, an order processing system, e.g. an order processing server, a cloud based server, mobile sort walls, a sorting kiosk, mobile robotic carts, warehouse devices, customer devices, e.g. computers, laptops, mobile smartphones, etc., and/or communications devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., an order processing server, a sorting kiosk, a mobile sort wall, etc. are configured to perform the steps of the methods described as being performed by the devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., order processing server, a sorting kiosk, a mobile sort wall, including, with a processor which includes a component corresponding to each of the steps of the various described methods performed by the device in which the processor is included. In some but not all embodiments a device, e.g., an order processing server, a sorting kiosk, a mobile sort wall, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an order processing server, sorting kiosk, a mobiles ort wall, a mobile robotic cart, a customer device, or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method comprising:
   selecting from a plurality of orders a first set of orders, said first set of orders being for a first set of products which can be stored on a first sort wall;
   assigning said first set of orders to a first set of robotic carts used to collect products included in said first set of orders;
   moving collected products included in said first set of orders to said first sort wall, said first sort wall being coupled to a kiosk;
   detecting a removal of the first sort wall from the kiosk;
   detecting a connection of a second sort wall to the kiosk; and
   selecting from the plurality of orders a second set of orders, said second set of orders being for a second set of products that can be stored on the second sort wall.

2. The method of claim 1, wherein said first sort wall is a first mobile sort wall.

3. The method of claim 2, further comprising:
   moving said first mobile sort wall to a packaging area after said first mobile sort wall is loaded with the collected products included in said first set of orders.

4. The method of claim 3, further comprising:
   assigning said second set of orders to a second set of robotic carts used to collect products included in the second set of orders; and
   moving collected products included in the second set of orders to a second mobile sort wall.

5. The method of claim 4, wherein moving collected products included in said first set of orders to said first sort wall includes:
   scanning a first product collected from a first robotic cart in said first set of robotic carts; and
   controlling a light on said first mobile sort wall to indicate an intended storage location on the first mobile sort wall where the first product is to be placed.

6. The method of claim 5, further comprising:
   detecting insertion of the first product into a storage location on the first mobile sort wall or activation of a switch associated with a storage location indicating placement by an operator in the storage location on the first mobile sort wall;
   checking to confirm that the first product was placed in the intended storage location; and
   generating an alert indicating miss-placement of the first product when said check indicates that the first product was placed in the wrong storage location; and
   deactivating said light on the first mobile sort wall used to indicate an intended storage location when said check confirms correct product placement on said first mobile sort wall.

7. The method of claim 6, wherein said step of scanning a first product is performed using a scanner of the kiosk coupled to said first mobile sort wall.

8. The method of claim 7, wherein said kiosk controls a mobile sort wall to indicate storage locations for products based on product storage location information provided by an order processing system which selects the orders to be included in said first and second sets of orders, said order processing system providing different product placement maps for said first and second mobile sort walls to control placement of said first set of products in said first mobile sort wall and said second set of products in said second mobile sort wall.

9. The method of claim 8, wherein more sets of robotic carts are being used to collect products corresponding to different mobile sort walls than there are mobile sort walls being loaded at any given time.

10. A system, the system including:
    a kiosk configured to control product sorting and placement of sets of products on mobile sort walls based on product to sort wall mapping information stored in said kiosk, said kiosk including:
    memory including product to sort wall mapping information;
    a scanner for scanning a product;
    a processor configured to control said kiosk to:
       detect connection of a first mobile sort wall; and
       control the first mobile sort wall to indicate a location where a first product is to be placed in a first mobile sort wall in response to the first product being scanned by said scanner.

11. The system of claim 10, wherein said processor is further configured to:
    check to confirm that the product was placed in the intended storage location in response to an indication from the first mobile sort wall that the product was inserted into a storage location;
    generate an alert indicating miss-placement of the product when said check indicates that the product was placed in the wrong storage location; and
    deactivate a light on the first sort wall used to indicate an intended storage location when said check confirms correct product placement on said first mobile sort wall.

12. The system of claim 10, further comprising:
    said first mobile sort wall.

13. The system of claim 12, wherein said first mobile sort wall is mounted on wheels.

14. The system of claim 13, wherein said first mobile sort wall includes an electric motor for driving at least some of said wheels.

15. The system of claim 14, wherein said kiosk is a mobile kiosk which is mounted on wheels.

16. The system of claim 15, further comprising:
    a plurality of robotic pick carts.

17. The system of claim 16, further comprising:
an order system including:
- an interface for receiving orders; and
- a second processor configured to control said order system to:
  - select from a plurality of orders a first set of orders, said first set of orders being for a first set of products which can be stored on a first mobile sort wall;
  - assign said first set of orders to a first set of robotic carts used to collect products included in said first set of orders; and
  - communicate product to sort wall mapping information indicating where products in said first set of products should be placed in a first mobile sort wall.

18. The system of claim 17, wherein said first mobile sort wall includes:
- a row of lights under a set of storage locations, said kiosk controlling said lights to indicate where a product should be placed after a product is scanned; and
- a row of switches under said set of storage locations or sensors which can detect placement of a product in a storage location.

19. The system of claim 18,
wherein said first mobile sort wall is configurable to include bins of different sizes; and
wherein lights in said row of lights are controlled as a function of the sort wall configuration.

20. The system of claim 19 wherein said system includes more mobile sort walls than kiosks.

* * * * *